United States Patent

Kehr et al.

[15] 3,661,744

[45] May 9, 1972

[54] PHOTOCURABLE LIQUID POLYENE-POLYTHIOL POLYMER COMPOSITIONS

[72] Inventors: Clifton L. Kehr, Silver Spring; Walter R. Wszolek, Sykesville, both of Md.

[73] Assignee: W. R. Grace & Co., New York, N.Y.

[22] Filed: June 8, 1970

[21] Appl. No.: 44,607

Related U.S. Application Data

[63] Continuation-in-part of Ser. No. 617,801, Feb. 23, 1967, abandoned, which is a continuation-in-part of Ser. No. 567,841, July 26, 1966, abandoned.

[52] U.S. Cl...................204/159.14, 117/93.31, 117/132 B, 117/132 R, 117/138.8 F, 117/148, 117/155, 204/159.15, 204/159.18, 204/159.23, 204/159.24, 260/2.5 A, 260/2.5 R, 260/17.4 R, 260/41 A, 260/41 B, 260/41 R, 260/41 AG, 260/63 UY, 260/77.5 BB, 260/77.5 CR, 260/77.5 MA, 260/77.5 AM, 260/79.5 B, 260/79.5 R, 260/79.5 NV, 260/858, 260/874

[51] Int. Cl......................C08d 1/00, C08f 1/16, C08c 11/54

[58] Field of Search................260/77.5 MA, 77.5 AM, 79.7, 260/79.5 B, 79.5 R, 79.5 CR; 204/159.18, 159.23, 159.14

[56] References Cited

UNITED STATES PATENTS

| | | | |
|---|---|---|---|
| 3,405,181 | 10/1968 | Gourdon | 260/79 |
| 3,278,352 | 10/1966 | Erickson | 260/79 |
| 3,371,072 | 2/1968 | Signouret et al. | 260/79 |
| 3,338,810 | 8/1967 | Warner | 260/79 |
| 3,412,049 | 11/1968 | Gmitter | 260/2.5 R |
| 2,921,006 | 1/1960 | Schmitz et al. | 204/159.15 |

*Primary Examiner*—Murray Tillman
*Assistant Examiner*—Richard B. Turer
*Attorney*—Eugene M. Bond and Kenneth E. Prince

[57] ABSTRACT

The invention disclosed is for a new photocurable liquid polymer composition which includes a liquid polyene component having a molecule containing at least two unsaturated carbon-to-carbon bonds disposed at terminal positions on a main chain of the molecule, a polythiol component having a molecule containing a multiplicity of pendant or terminally positioned —SH functional groups per average molecule, and a photocuring rate accelerator. The photocurable liquid polymer composition upon curing in the presence of actinic light forms odorless, solid, elastomeric or resinous products which may serve as sealants, coatings, adhesives and molded articles.

31 Claims, No Drawings

PHOTOCURABLE LIQUID POLYENE-POLYTHIOL POLYMER COMPOSITIONS

The present application for U.S. Letters Patent is a continuation-in-part of copending application Ser. No. 617,801, filed Feb. 23, 1967, and now abandoned, which in turn is a continuation-in-part of application Ser. No. 567,841, filed July 26, 1966, now abandoned.

This invention relates to a new photocurable liquid composition which includes a liquid polyene component having a molecule containing at least two unsaturated carbon-to-carbon bonds disposed at terminal positions on a main chain of the molecule, a polythiol component having a molecule containing a multiplicity of pendant or terminally positioned —SH functional groups per average molecule, and a photocuring rate accelerator.

It is well known in the art that cure of internally unsaturated polymers such as polybutadiene or polyisoprene may be effected with polythiols. However, such polymers, due mainly to residual internal unsaturation after curing, are unstable either to thermal oxidation or ultra-violet catalyzed oxidation, and are subject to rapid attack by ozone. Eventually degradation and embrittlement results in the internal double bond polymers, substantially reducing their useful service life.

A limitation of commercially available liquid polyurethane prepolymers is the fact that they are terminated by isocyanate (—NCO) groups. These —NCO groups are extremely unstable in storage, and are highly water-sensitive such that under practical conditions, they react with traces of moisture from the atmosphere to form gaseous carbon dioxide and amino groupings which in turn react with more —NCO to form eventually a highly viscous, sometimes completely insoluble urea-extended chain network. In cases where insolubilization occurs, the polymer has to be discarded at great expense. Further, if the —NCO-terminated prepolymers come in contact with traces of either acidic or basic impurities, dimerization and/or trimerization of the —NCO functions may take place to form viscous, sometimes insoluble products during storage. Even mild alkalis such as those constituents normally present on the surface of glass vessels and containers may cause storage problems.

A further limitation for some applications is found in polyurethane polymers of the prior art which are derived from aromatic diisocyanates or polyisocyanates such as tolylene-2,4-diisocyanate, tolylene-2,6-diisocyanate, 4,4'-diisocyanatodiphenylmethane, and the like. These aromatic diisocyanates (or mixtures thereof) enjoy widespread use in polyurethane elastomers, foams, and coatings, because of their ready commercial availability, high degree of reactivity and relatively low cost. The derived polyurethane products, however, are known to turn yellow, amber, orange or brown in color when exposed to sunlight, ultraviolet light or other forms of actinic radiation. This yellowing tendency imparts a definite limitation on the usage of such polyurethanes in many applications. There is evidence in the technical literature that shows that this yellowing or discoloration problem is directly attributable to the aromatic (benzeneoid) nucleus in the aromatic diisocyanates, and accordingly serious yellowing problems in polyurethanes may be avoided by use of aliphatic polyisocyanates such as hexamethylene diisocyanate. These aliphatic polyisocyanates, however, are difficult to manufacture, are relatively expensive and are relatively slow in reaction rate during polymer formation reactions in comparison to the aromatic polyisocyanates.

The use of polymeric liquid polythiol polymers which are cured to solid elastomeric products by oxidative coupling of the thiol (—SH) groups to disulfides (—S—S—groups) are known in the sealants, coatings and adhesives field. Oxidizing agents such as $PbO_2$ are commonly used to effect this curing reaction. These mercapto-containing compounds, however, both before and after curing with $PbO_2$-type curing system yield elastomeric compositions with an offensive odor which limits their usefulness generally to outdoor service. Thus, oxidatively-cured mercapto polymer systems have found restricted commercial acceptance due to their offensive odors.

A limitation of commercial liquid polymeric sealants and coatings is found in one-package systems. All the compounding ingredients, including the curing agents, are blended together and charged into a tightly sealed container until used. In these commercial sealants (polysulfides, polydisulfides, polymercaptans, polyurethanes and polysilicones), the curing reaction of one-package systems is initiated by moisture ($H_2O$) from the air. The moisture-curable systems leave something to be desired because the moisture content of the air varies widely. Hence, the curing performance of moisture-curable adhesives, coatings and sealants is variable and is difficult to predict and control. In the case of polyurethanes a further disadvantage of moisture-curable systems is observed. In the curing reaction (—NCO groups reacting with $H_2O$) a volatile gas (carbon dioxide) is liberated and this evolved gas tends to cause unsightly and property-weakening gas pockets or voids in the final product.

It has now been found that numerous defects of the prior art may be effectively overcome by practice of the present invention which provides a new photocurable liquid composition containing particular polyenes which are curable by polythiols to solid resins or elastomers. For example, when urethane-containing polyenes are compounded with polythiols, the prepared composition may be stored safely for long periods of time in the absence of actinic light. Upon exposure of actinic light such as ultraviolet light, the prepared system may be cured rapidly and controllably to a polythioether-polyurethane product which is low in cost and equal or better in reaction rate in polymer formation when compared with compositions derived from conventional technology.

Generally stated, the present invention provides a photocurable composition which comprises a particular polyene component, a polythiol component, and a photocuring rate accelerator.

The polyene component may be represented by the formula:

$$[A]\text{---}(X)_m$$

wherein $m$ is an integer of at least 2, wherein X is a member selected from the group consisting of:

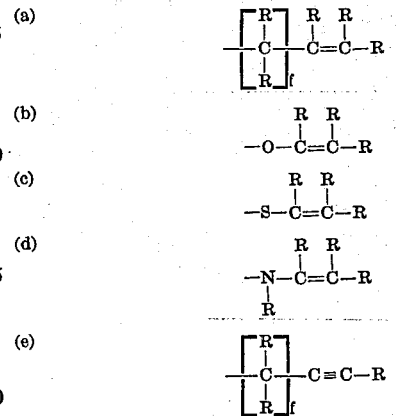

In the groups (a) to (e), $f$ is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, and cycloalkyl and substituted cycloalkyl. The substituents on the substituted members are selected from the group consisting of nitro, chloro, fluoro, acetoxy, acetamide, phenyl, benzyl, alkyl, alkoxy and cycloalkyl. Alkyl and alkoxy have from one to nine carbon atoms and cycloalkyl has from three to eight carbon atoms.

The members (a) to (e) are connected to [A] through divalent chemically compatible derivative members. The members (a) to (e) may be connected to [A] through a divalent chemically compatible derivative member of the group consisting of Si(R)$_2$, carbonate, carboxylate, sulfone,

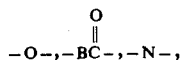

alkyl and substituted alkyl, cycloalkyl and substituted cycloalkyl, urethane and substituted urethane, urea and substituted urea, amide and substituted amide, amine and substituted amine, and aryl and substituted aryl. The alkyl members have from one to nine carbon atoms, the aryl members are either phenyl or naphthyl, and the cycloalkyl members have from three to eight carbon atoms with R and said members substituted being defined above. B is a member of the group consisting —O—, —S—, and —NR—.

The member [A] is polyvalent; free of reactive carbon-to-carbon unsaturation; free of highly water-sensitive members; and consisting of atoms selected from the group consisting of carbon, oxygen, nitrogen, chlorine, bromine, fluorine, phosphorus, silicon and hydrogen.

The polyene component has a molecular weight in the range from about 64 to 20,000, preferably about 200 to about 10,000; and a viscosity in the range from essentially 0 to 20 million centipoises at 70° C. as measured by a Brookfield Viscometer.

The polythiol component has a molecular weight in the range from about 50 to about 20,000 and the general formula:

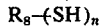

wherein $R_8$ is a polyvalent organic moiety free from reactive carbon-to-carbon unsaturation and $n$ is at least 2. The polyene/polythiol mole ratio are selected so as to provide a solid, self-supporting cured product under ambient conditions in the presence of actinic light.

More particularly, the member [A] of the polyene composition may be formed primarily of alkyl radicals, phenyl and urethane derivatives, oxygenated radicals, and nitrogen substituted radicals. The member [A] may also be represented by the formula:

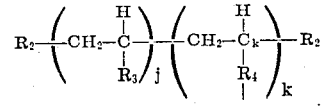

wherein $j$ and $k$ are integers greater than 1; $R_2$ is a member of the group consisting of hydrogen, and alkyl having one to nine carbon atoms; $R_3$ is a member of the group consisting of hydrogen, and saturated alkyl having one to nine carbon atoms; $R_4$ is a divalent derivative of the group consisting of phenyl, benzyl, alkyl, cycloalkyl, substituted phenyl, substituted benzyl, substituted alkyl and substituted cycloalkyl; with the terms alkyl, cycloalkyl and members substituted being defined above.

General representative formulas for the polyenes of the present invention may be prepared as exemplified below:

I. Poly (alkylene-ether) Polyol Reacted with Unsaturated Monoisocyanates Forming Polyurethane Polyenes and Related Polymers Difunctional

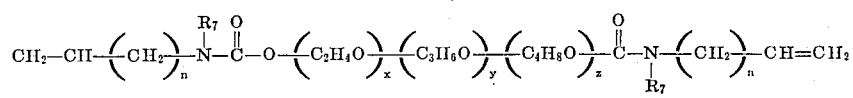

Trifunctional

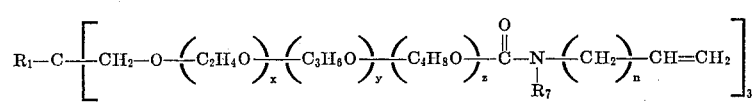

Tetrafunctional

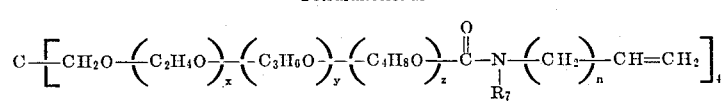

Tri-to-Hexafunctional

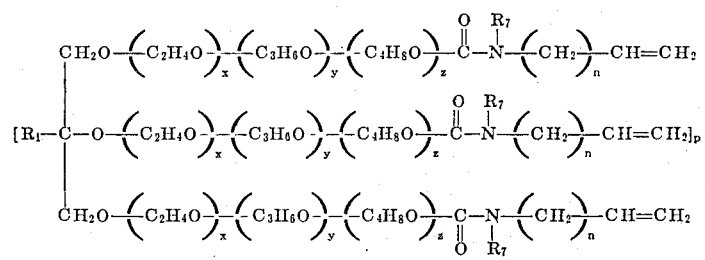

Interconnected-Modified Difunctional

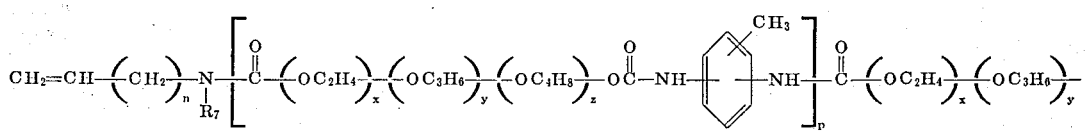

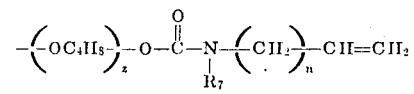

Interconnected-Modified Tetrafunctional

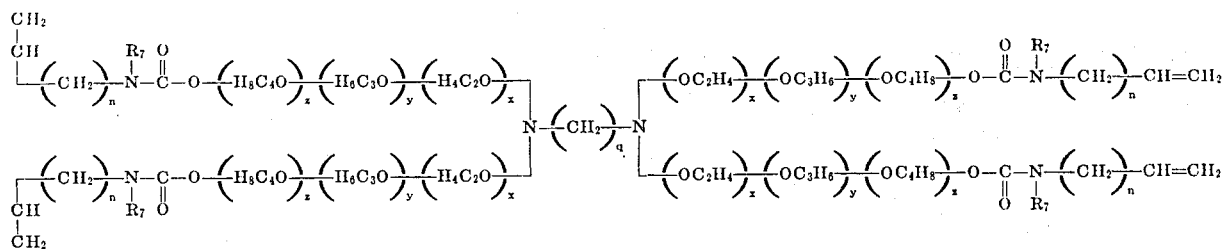

II. Poly (alkylene-ester) Polyol Reacted with Unsaturated Monoissocyanates Forming Polyurethane Polyenes and Related Polymers Difunctional

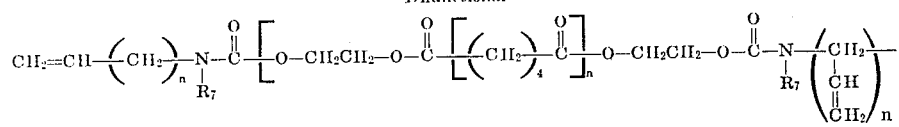

Interconnected-Modified Difunctional

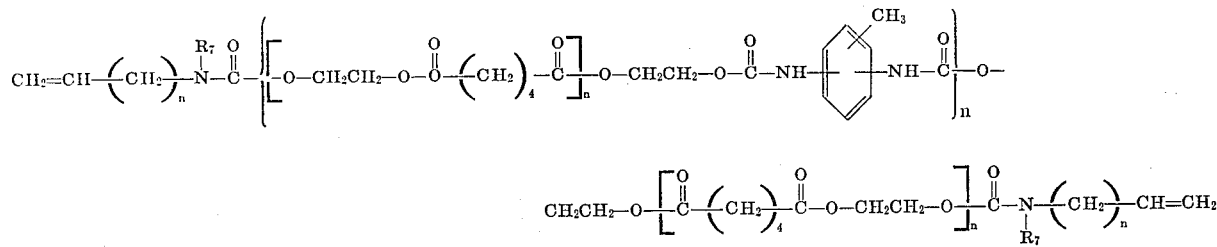

III. Poly (alkylene-ether) Polyol Reacted with Polyisocyanate and Unsaturated Monoalcohol Forming Polyurethane Polyenes and Related Polymers Difunctional

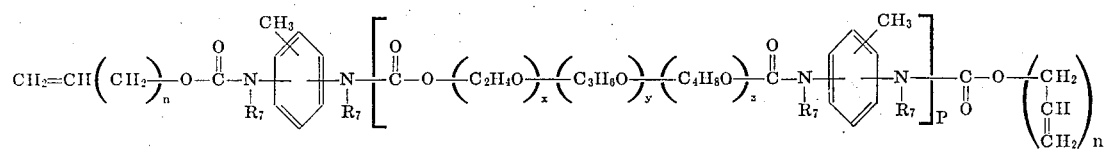

Trifunctional

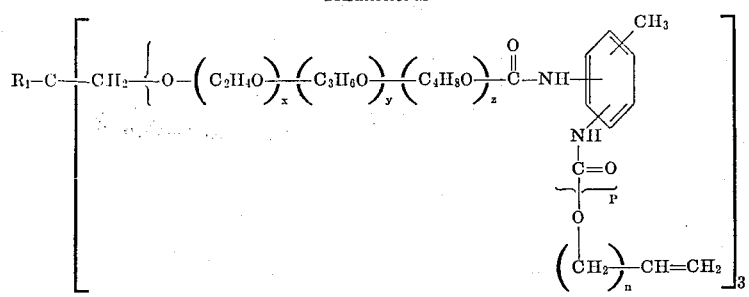

Tetrafunctional

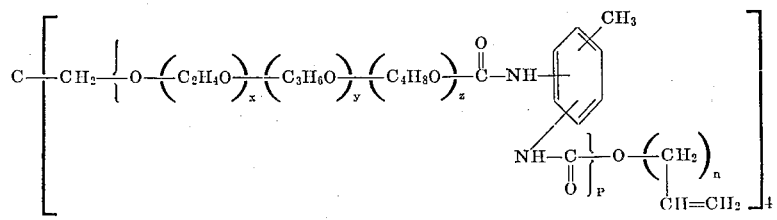

In the above formulas, the sum of $x + y + z$ in each chain segment is at least 1; P is an integer of 1 or more; $q$ is at least 2; $n$ is at least 1; $R_1$ is selected from the group consisting of hydrogen, phenyl, benzyl, alkyl, cycloalkyl, and substituted phenyl; and $R_7$ is a member of the group consisting of

hydrogen, phenyl, cycloalkyl, and alkyl.

The novel class of polyenes of this invention derived from carbon to carbon unsaturated monoisocyanates may be characterized by extreme ease and versatility of manufacture when the liquid functionality desired is greater than about three. For example, consider an attempted synthesis of a polyhexene starting with an —OH terminated polyalkylene ether hexol such as "Niax" Hexol LS–490 (Union Carbide Corp.) having a molecular weight of approximately 700, and a viscosity of 18,720 cps at 20° C. An attempt to terminate this polymer with ene groups by reacting 1 mole of hexol with 6 moles of tolylene diisocyanate (mixed-2,4-, -2-6- isomer product) and 6 moles of allyl alcohol proceeded nicely but resulted in a prematurely chain extended and crosslinked solid product rather than an intended liquid polyhexene. Using the monoisocyanate route, however, this premature chain extension may be avoided and the desired polyurethane-containing liquid polyhexene may be very easily prepared by a simple, one-step reaction of one mole of hexol with 6 moles of allyl isocyanate. This latter polyhexene has the added advantage of being cured using the teachings of this invention to a non-yellowing polythioether polyurethane product. Similarly, the unsaturated monoisocyanate technique may be used to prepare liquid polyenes from other analagous highly functional polyols such as cellulose, polyvinyl alcohol, partially hydrolized polyvinyl acetate, and the like, and highly functional polyamines such as tetraethylene pentamine, polyethyleneimine, and the like.

A general method of forming one type of polyene containing urethane groups is to react a polyol of the general formula $R_{11}$–$(OH)_n$ wherein $R_{11}$ is a polyvalent organic moiety free from reactive carbon-to-carbon unsaturation and $n$ is at least 2; with a polyisocyanate of the general formula $R_{12}$–$(NCO)_n$ wherein $R_{12}$ is a polyvalent organic moiety free from reactive carbon-to-carbon unsaturation and $n$ is at least 2 and a member of the group consisting of an ene-ol, yne-ol, ene-amine and yne-amine. The reaction is carried out in an inert moisture-free atmosphere (nitrogen blanket) at atmospheric pressure at a temperature in the range from 0° to about 120°C for a period of about 5 minutes to about 25 hours. In the case where an ene-ol or yne-ol is employed, the reaction is preferably a one step reaction wherein all the reactants are charged together. In the case where an ene-amine or yne-amine is used, the reaction is preferably a two step reaction wherein the polyol and the polyisocyanate are reacted together and thereafter preferably at room temperature, the ene-amine or yne-amine is added to the NCO terminated polymer formed. The group consisting of ene-ol, yne-ol, ene-amine and yne-amine are usually added to the reaction in an amount such that there is one carbon-to-carbon unsaturation in the group member per hydroxyl group in the polyol and said polyol and group member are added in combination in a stoichiometric amount necessary to react with the isocyanate groups in the polyisocyanate.

A second general method of forming a polyene containing urethane groups (or urea groups) is to react a polyol (or polyamine) with an ene-isocyanate or an yne-isocyanate to form the corresponding polyene. The general procedure and stoichiometry of this synthesis route is similar to that described for polyisocyanates in the preceding. In this instance, a polyol reacts with an ene-isocyanate to form the corresponding polyene. It is found, however, that products derived from this route, when cured in the presence of an active light source and a polythiol, may form relatively weak solid polythioether products. To obtain stronger cured products, it is desirable to provide polar functional groupings within the main chain backbone of the polymeric polyene.

These polar functional groupings serve as connecting linkages between multiple repeating units in the main chain series, and serve as internal strength-reinforcing agents by virtue of their ability to create strong interchain attraction forces between molecules of polymer in the final cured composition.

Polyenes containing ester groups may be formed by reacting an acid of the formula $R_{13}$–$(COOH)_n$ wherein $R_{13}$ is a polyvalent organic moiety free from reactive carbon-to-carbon unsaturation and $n$ is at least 2; with either an ene-ol or yne-ol. The reaction is carried out in an inert moisture-free atmosphere (nitrogen blanket) at atmospheric pressure at a temperature in the range from 0° to about 120° C. for a period of 5 minutes to 25 hours. Usually the reaction is carried out in the presence of a catalyst (p-toluene sulfonic acid) and in the presence of a solvent, e.g., benzene at refluxing temperature. The water formed is azeotroped off of the reaction.

Another method of making an ester containing polyene is to react a polyol of the formula $R_{11}$–$(OH)_n$ wherein $R_{11}$ is a polyvalent organic moiety free from reactive carbon-to-carbon unsaturation and $n$ is at least 2; with either an ene-acid or an yne-acid. The reaction is carried out in the same manner as set out above for the ester-containing polyenes. In practicing this latter technique, however, it may be found that ene-acids (or yne-acids) in which the ene (or yne) group is adjacent to an activating polar moiety such as

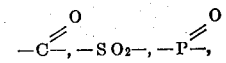

and the like are generally not desirable within the scope of this invention. These activated ene compounds are very prone to self-polymerization reactions to form vinyl polymers. Excessive amounts of self-polymerization of the ene groups is an undesirable side reaction in the present invention since the desired polythioether reaction products are precluded whenever self-polymerization of the ene groups occurs. Finally, the presence of activated, easily self-polymerizable ene groups in the composition leads to oxygen inhibition during curing, storage stability problems, or the need for excessively high inhibitor concentrations.

In forming the urethane-containing polyenes of the present invention, catalytic amounts of a catalyst may be employed to speed up the reaction. This is especially true in the case where an ene-ol is used to form the polyene. Such catalysts are well known to those in the art and include organometallic compounds such as stannous octoate, stannous oleate, dibutyl tin dilaurate, cobalt acetylacetonate, ferric acetylacetonate, lead naphthanate and dibutyl tin diacetate.

In summary, by admixing polyenes or polyynes containing two or more reactive unsaturated carbon-to-carbon bonds located terminal from the main chain with a polythiol containing two or more thiol groups per molecule and thereafter exposing said liquid mixture having photocuring rate accelerator to actinic light, there is provided an essentially odorless solid elastomeric or resinous polymeric product.

Polythiol as used herein refers to simple or complex organic compounds having a multiplicity of pendant or terminally positioned —SH functional groups per average molecule.

On the average the polythiol must contain two or more —SH groups/molecule and have a viscosity range of essentially 0 to 20 million centipoises (cps) at 70° C as measured by a Brookfield Viscometer either alone or when in the presence of an inert solvent, aqueous dispersion or plasticizer. Operable polythiols in the instant invention usually have molecular weights in the range about 50 to about 20,000, and preferably from about 100 to about 10,000.

The polythiols operable in the instant invention may be exemplified by the general formula $R_8$–$(SH)_n$ where $n$ is at least 2 and $R_8$ is a polyvalent organic moiety free from reactive carbon-to-carbon unsaturation. Thus $R_8$ may contain cyclic groupings and hetero atoms such as N, P or O and primarily contains carbon-carbon, carbon-hydrogen, carbon-oxygen, or silicon-oxygen containing chain linkages free of any reactive carbon-to-carbon unsaturation.

One class of polythiols operable with polyenes to obtain essentially odorless polythioether products are esters of thiol-containing acids of the formula HS—$R_9$—COOH where $R_9$ is an organic moiety containing no reactive carbon-to-carbon unsaturation with polyhydroxy compounds of structure $R_{10}$ OH)$_n$ where $R_{10}$ is an organic moiety containing no reactive carbon-to-carbon unsaturation, and $n$ is 2 or greater. These components will react under suitable conditions to give a polythiol having the general structure:

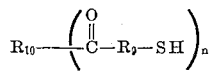

where $R_9$ and $R_{10}$ are organic moieties containing no reactive carbon-to-carbon unsaturation, and $n$ is 2 or greater.

Certain polythiols such as the aliphatic monomeric polythiols (ethane dithiol, hexamethylene dithiol, decamethylene dithiol, tolylene-2,4-dithiol, and the like, and some polymeric polythiols such as a thiol-terminated ethylcyclohexyl dimercaptan polymer, and the like, and similar polythiols which are conveniently and ordinarily synthesized on a commercial basis, although having obnoxious odors, are operable but many of the end products are not widely accepted from a practical, commercial point of view. Examples of the polythiol compounds preferred because of relatively low odor level include but are not limited to esters of thiogylcolic acid (HS—$CH_2$COOH), α-mercaptopropionic acid (HS—CH($CH_3$)—COOH and β-mercaptopropionic acid (HS—$CH_2CH_2$COCH) with polyhydroxy compounds such as glycols, triols, tetraols, pentaols, hexaols, and the like. Specific examples of the preferred polythiols include but are not limited to ethylene glycol bis (thioglycolate), ethylene glycol bis (β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), all of which are commercially available. A specific example of a preferred polymeric polythiol is polypropylene ether glycol bis (β-mercaptopropionate) which is prepared from polypropylene-ether glycol (e.g. Pluracol P201, Wyandotte Chemical Corp.) and β-mercaptopropionic acid by esterification.

The preferred polythiol compounds are characterized by a low level of mercaptan-like odor initially, and after reaction, give essentially odorless polythioether end products which are commercially attractive and practically useful resins or elastomers for both indoor and outdoor applications.

Prior to curing, the curable liquid polymer may be formulated for use as 100 percent solids, or disposed in organic solvents, or as dispersions or emulsions in aqueous media.

The curable liquid polymer compositions prior to curing may readily be pumped, poured, siphoned, brushed, sprayed, doctored, or otherwise handled as desired. Following application, curing in place to a solid resin or elastomer may be effected either very rapidly or extremely slowly as desired by manipulation of the compounding ingredients and the method of curing.

The liquid polythioether-forming components and compositions, prior to curing, may be admixed with or blended with other monomeric and polymeric materials such as thermoplastic resins, elastomers or thermosetting resin monomeric or polymeric compositions. The resulting blend may be subjected to conditions for curing or co-curing of the various components of the blend to give cured products having unusual physical properties.

Although the mechanism of the curing reaction is not completely understood, it appears most likely that the curing reaction may be initiated by most any actinic light source which disassociates or abstracts a hydrogen atom from an SH group, or accomplishes the equivalent thereof. Generally the rate of the curing reaction may be increased by increasing the temperature of the composition at the time of initiation of cure. In many applications, however, the curing is accomplished conveniently and economically by operating at ordinary room temperature conditions. Thus for use in elastomeric sealants, it is possible merely to photoexpose the polyene, polythiol, photocuring rate accelerator admixture to ambient conditions and obtain a photocured solid elastomeric or resinous product.

By proper choice of type and concentration of photocuring rate accelerator for initiation, the curing period required for conversion of the polyene/polythiol composition from the liquid to the solid state may be varied greatly as desired. In combination with suitable accelerators or retarders, the curing period may vary from about a second or less to about 30 days or more. In general, short curing periods are achieved in applications where thin films of curable composition are required, such as in the field of coatings whereas the long curing periods are achieved and desired where more massive layers of composition are required, such as in the field of elastomeric sealants.

A class of actinic light useful herein is ultraviolet light and other forms of actinic radiation which are normally found in radiation emitted from the sun or from artificial sources such as Type RS Sunlamps, carbon arc lamps, xenon arc lamps, mercury vapor lamps, tungsten halide lamps and the like. Ultraviolet radiation may be used most efficiently if the photocurable polyene/polythiol composition contains a suitable photocuring rate accelerator. Curing periods may be adjusted to be very short and hence commercially economical by proper choice of ultraviolet source, photocuring rate accelerator and concentration thereof, temperature and molecular weight, and reactive group functionality of the polyene and polythiol. Curing periods of less than about 1 second duration are possible, especially in thin film applications such as desired for example in coatings and adhesives.

Conventional curing inhibitors or retarders which may be used in order to stabilize the components or curable compositions so as to prevent premature onset of curing may include hydroquinone; p-tert.-butyl catechol; 2,6-di tert.-butyl-p-methylphenol; phenothiazine; N-phenyl-2-naphthylamine; inert gas atmospheres such as helium, argon, nitrogen and carbon dioxide; vacuum; and the like.

It is understood to be within the scope of this invention that the photocuring rate accelerator may be present as a separate and distinct component such as azobenzene, as a mixture of two or more separate components, such as benzophenone; benzanthrone; anthrone, and dibenzosuberone; carbon tetrachloride and phenanthrene; and the like, or in a chemically combined form within the molecular structure of either the polyene or the polythiol. An example of this latter condition wherein the photocuring rate accelerator is present not as a separate component, but rather in a form chemically combined within the polyene component is the following structure which contains four reactive carbon-to-carbon unsaturated groupings and one diaryl ketone grouping per average molecule:

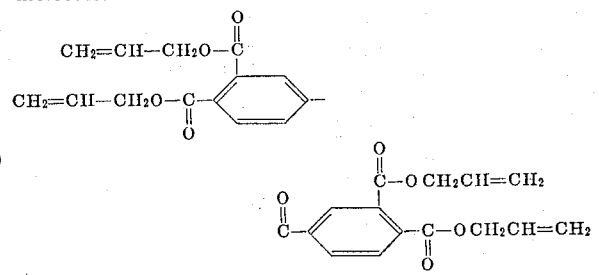

It is further understood that the polyene, the polythiol or the photocuring rate accelerator may be formed in situ in the photocurable composition without departing from the spirit of this invention.

Specifically useful herein are chemical photocuring rate accelerators such as benzophenone, acetophenone, acenapthene-quionone, o-methoxy benzophenone, Thioxanthen-9-one, xanthen-9-one, 7-H-Benz[de]anthracen-7-one, diben-zosuberone, 1-napththaldehyde, 4,4'-bis (dimethylamino) benzophenone, fluorene-9-one, 1'- acetonaphthone, 2'-ace-tonaphthone, anthraquinone, 1-indanone, 2-tert.-butyl anthraquinone, valerophenone, hexanophenone, 8-phenyl-butyrophenone, p-morpholinopropiophenone, 4-morpholino-benzophenone, 4'-morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole 1,3,5-triacetylbenzene, and the like including blends thereof, to greatly reduce the exposure times.

The curing rate accelerators are usually added in an amount ranging from about 0.005 to about 50 percent by weight of the photocurable composition, with a preferred range being from about 0.05 to about 25 percent by weight. Preferred photocuring rate accelerators are the aldehyde and ketone carbonyl compounds having at least one aromatic nucleus attached directly to the $-\overset{O}{\overset{\|}{C}}-$ group.

To obtain the maximum strength, solvent resistance, creep resistance, heat resistance and freedom from tackiness, the reaction components consisting of the polyenes and polythiols of this invention are formulated in such a manner as to give solid, crosslinked, three dimensional network polythioether polymer systems on curing. In order to achieve such infinite network formation the individual polyenes and polythiols must have a functionality of at least 2 and the sum of the functionalities of the polyene and polythiol components must always be greater than 4. Blends and mixtures of the polyenes and the polythiols containing said functionality are also operable herein.

The compositions to be cured, i.e., (converted to solid resins or elastomers) in accord with the present invention may, if desired, include such additives as antioxidants, accelerators, dyes, inhibitors, activators, fillers, pigments, antistatic agents, flame-retardant agents, thickeners, thixotropic agents, surface-active agents, viscosity modifiers, extending oils, plasticizers, tackifiers and the like within the scope of this invention. Such additives are usually preblended with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight and preferably about 0.0005 to about 300 parts on the same basis.

The compounding of the components prior to curing may be carried out in several ways. For example, the polyene, polythiol and any other additives may be admixed and charged to an aerosol can, drum, tube, or cartridge for subsequent use.

Another useful method of compounding is to prepare in an ambient atmosphere by conventional mixing techniques but in the absence of actinic radiation a composition consisting of polyene, antioxidant (to inhibit spontaneous oxygen-initiated curing), polythiol, UV sensitizer or photoinitiator, and other inert additives. This composition may be stored in the dark for extended periods of time, but on exposure to actinic radiation (e.g., ultraviolet light, sunlight, etc.) will cure controllably and in a very short time period to solid polythioether products.

The mole ratio of ene/thiol groups for preparing the curable composition is from about 0.2/1 to about 5/1, and desirably about 0.75/1 to about 1.5/1 group ratio.

The following examples will aid in explaining, but should not be deemed as limiting, the instant invention. In all cases, unless otherwise noted, all parts and percentages are by weight.

FORMATION OF POLYENE PREPOLYMER

Example 1

458 g. (0.23 moles) of a commercially available liquid polymeric diisocyanate sold under the tradename "Adiprene L-100" by E. I. duPont de Nemours & Co. was charged to a dry resin kettle maintained under a nitrogen atmosphere and equipped with a condenser, stirrer, thermometer, and gas inlet and outlet. 37.8 g. (0.65 moles) of allyl alcohol was charged to the kettle and the reaction was continued for 17 hours with stirring at 100° C. Thereafter the nitrogen atmosphere was removed and the kettle was evacuated 8 hours at 100° C. 50 cc. dry benzene was added to the kettle and the reaction product was azeotroped with benzene to remove the unreacted alcohol. This allyl terminated liquid prepolymer had a molecular weight of approximately 2100 and will be referred to as Prepolymer A hereinafter.

EXAMPLE 2

400 g. (0.2 moles) of "Adiprene L–100" was charged to a dry resin kettle maintained under nitrogen and equipped with a condenser, stirrer, thermometer and gas inlet and outlet. 25.2 g. (0.43 moles) of propargyl alcohol (HC ≡ C—CH$_2$OH) was added to the kettle and the reaction was continued with stirring for 18 hours at 160° C. Thereafter the nitrogen atmosphere was removed and the kettle was evacuated 16 hours at 100° C followed by azeotropic distillations with 50 cc. water and then 50 cc. benzene to remove any excess propargyl alcohol. This HC ≡ C— terminated liquid prepolymer had a viscosity of 27,500 centipoises at 70° C and a molecular weight of 2100 and will be referred to as Prepolymer B hereinafter.

EXAMPLE 3

1 mole of commercially available poly(ethylene ether) glycol having a molecular weight of 1450 and a specific gravity of 1.21 was charged to a resin kettle maintained under nitrogen and equipped with a condenser, stirrer, thermometer and a gas inlet and outlet. 2.9 g. dibutyl tin dilaurate as a catalyst was charged to the kettle along with 2 moles tolylene-2,4-diisocyanate and 2 moles of allyl alcohol. The reaction was continued with stirring at 60° C for 2 hours. Thereafter a vacuum of 1 mm. was applied for 2 hours at 60° C to remove the excess alcohol. This CH$_2$ = CH— terminated prepolymer had a molecular weight of approximately 1950 and will hereinafter be referred to as Prepolymer C.

EXAMPLE 4

1 mole of a commercially available poly(propylene ether) glycol having a molecular weight of about 1958 and a hydroxyl number of 57.6 was charged to a resin kettle equipped with a condenser, stirrer, thermometer and a gas inlet and outlet. 4 g. of dibutyl tin dilaurate as a catalyst was added to the kettle along with 348 g. (2.0 moles) of tolyene-2,4-diiso cyanate and 116 g. (2 moles) of allyl alcohol. The reaction was carried out for 20 minutes at room temperature under nitrogen. Excess alcohol was stripped from the reaction kettle by vacuum over a 1 hour period. The thus formed CH$_2$ = CH— terminated liquid prepolymer had a molecular weight of approximately 2400 and will hereinafter be referred to as Prepolymer D.

EXAMPLE 5

750 g. of a N-containing tetrol (hydroxyl functionality = 4 ) available from Wyandotte Chemicals Corp. under the tradename "Tetronic Polyol 904" having a M.W. of 7,500 was placed in a reaction vessel heated at 110° C. The flask was maintained under vacuum for 1 hour. Then, under an atmosphere of nitrogen, 0.1 cc. dibutyl tin dilaurate was added and the flask was cooled to 50° C. Now 18.3 g. allyl isocyanate was added slowly, maintaining the temperature at about 95° C for about 1 hour after the addition was completed. The thus formed polymeric polyene (i.e., Prepolymer E hereinafter) had a theoretical allyl functionality of 2.2, a theoretical hydroxyl functionality of 1.8, and a calculated molecular weight of about 7,683.

EXAMPLE 6

To a resin kettle maintained under a nitrogen atmosphere and equipped with a condenser, stirrer, thermometer and gas inlet and outlet was added 843 g. of a commercially available liquid diisocyanate prepolymer sold under the tradename "Multrathane F-196" by Mobay Chemical Co., said prepolymer having a molecular weight of about 1,680 and an available isocyanate content of 4.7 – 5.2 percent. 87 g. (1.5 moles) of allyl alcohol was added to the kettle and the reaction was continued for 18 hours at 140° C with stirring. Thereafter the nitrogen atmosphere was removed and the kettle was evacuated for 22 hours at 100° C. 50 cc. of dry benzene was added to the kettle and the reaction product was azeotroped therewith to remove any unreacted alcohol. This $CH_2=CH-$ terminated liquid prepolymer had a viscosity of 25,000 centipoises at 70° C and a molecular weight of approximately 1800 and will be referred to as Prepolymer F hereinafter.

EXAMPLE 7

678 g. (0.34 moles) of a commercially available poly(propylene ether) glycol sold under the tradename NIAX by Union Carbide Co. and having a molecular weight of about 2025 was degassed for 2 hours at 100° C and thereafter charged to a resin kettle maintained under a nitrogen atmosphere and equipped with a condenser, stirrer, thermometer and gas inlet and outlet. 118 g. (0.68 moles) of tolylene 2,4-diisocyanate was charged to the kettle and the reaction was heated with stirring for 2 3/4 hours at 120° C. After cooling, 58 g. (1.0 moles) of allyl alcohol was added to the kettle and the mixture was refluxed at 120° C for 16 hours under nitrogen. Excess allyl alcohol was removed overnight by vacuum at 100° C. Half of the allyl terminated liquid prepolymer having a viscosity of 19,400 cps at 30° C as measured on a Brookfield Viscometer was removed from the kettle and will be referred to hereinafter as Prepolymer G. The other half portion of the prepolymer was combined with 50 cc. of dry benzene and azeotroped overnight following which excess benzene was pulled out under vacuum for 5 hours at 120° C. This portion of the allyl-terminated liquid prepolymer had a viscosity of 15,600 cps at 70° C as measured on a Brookfield Viscometer and a molecular weight of approximately 2,500 and will hereinafter be referred to as Prepolymer H.

EXAMPLE 8

751 g. (0.38 moles) of a commercially available poly(propylene ether) glycol sold under the tradename "Pluracol P 2010" by Wyandotte Chemical Co. was degassed at room temperature for 3 hours and then charged to a dry resin kettle maintained under a nitrogen atmosphere and equipped with a condenser, stirrer, thermometer and gas inlet and outlet. 132 g. (0.76 moles) of tolylene-2,4-diisocyanate was charged to the kettle and the kettle was heated for 2 hours at 120° C with stirring under nitrogen. After cooling 58 g. (1.0 moles) of allyl alcohol was added and the mixture was refluxed at 20° C overnight. Excess allyl alcohol was stripped by vacuum overnight at 120° C. The thus formed allyl terminated liquid prepolymer had a viscosity of 15,000 cps as measured on a Brookfield Viscometer at 70° C and a molecular weight of approximately 2,500 and will hereinafter be referred to as Prepolymer I.

EXAMPLE 9

To a 1 liter resin kettle equipped with stirrer, thermometer, gas inlet and outlet and heated to a temperature of 50° C was charged 610 g. (0.2 mole) of poly(tetramethylene ether)glycol, commercially available from Quaker Oats Co. and having a hydroxyl number of 37.1 along with 0.3 g. dibutyl tin dilaurate. The temperature of the kettle was raised to 110° C and the contents were freed of water under 1 millimeter vacuum for 1 hour. The resin kettle was cooled to 60° C and the system was placed under a protective atmosphere of nitrogen throughout the remainder of the reaction. 25.2 g. of allyl isocyanate, (0.4 mole) was added dropwise to the kettle at such a rate as to maintain the temperature at 60° C. When the NCO content dropped to 0.54 mg/g., 1 mm. vacuum again was applied and the system was heated at 70° C for 1 hour. The thus formed polymer product was a solid at room temperature but at 50° C is clear and pourable. The polymer product had a viscosity of 1,800 centipoises at 70° C as measured on a Brookfield Viscometer and an average molecular weight of approximately 3,200.

EXAMPLE 10

To a 1 liter resin kettle equipped with stirrer, thermometer, gas inlet and outlet was charged 591 g. (0.30 mole) of a poly(propylene ether) glycol commercially available from Union Carbide under the tradename "PPG 2025" and 0.3 g. of dibutyl tin dilaurate. The kettle was heated to 110° C and the contents were freed of water under 1 mm. vacuum for 1 hour. The kettle was cooled to 25° C and the system was placed under a protective atmosphere of nitrogen throughout the remainder of the reaction. 53.1 ml. (49.8 g., 0.6 mole) of allyl isocyanate commercially available from Chemetron Corp. was added to the system. An exotherm carried the temperature to 45° C in 22 minutes. After 60 minutes, the NCO content (as determined by titration) was 0.04 mg/g. The system was placed under 1 mm. vacuum and heated to 70° C to remove traces of unreacted allyl isocyanate. The resultant polymer product had a viscosity of 600 centipoises at 30° C as measured on a Brookfield Viscometer and an average molecular weight of approximately 2,200.

The next two examples show a method of preparing the polyenes of the instant invention by dehydration of polyether glycols.

EXAMPLE 11

100 g. of poly(propylene ether) glycol commercially available from Union Carbide under the tradename "PPG 2025" was poured through a hot tube filled with aluminum oxide at such a rate that the entire reaction took place in 2 hours. The tube was 1 inch in diameter with the reaction zone 1 ft. long and completely enclosed within a tube furnace. The alumina catalyst was 10–18 mesh and was maintained at 350° C using a Lindberg Hevi-Duty tube furnace. The tube was fitted with a dropping funnel and a nitrogen inlet at the top. Nitrogen pressure was kept on the system throughout the reaction. The product collected from the bottom of the tube was analyzed for unsaturation by the mercuric acetate titration method and was found to have 100 percent of the theoretical amount of unsaturation expected after dehydration of both terminal hydroxyl groups of the poly(propylene ether) glycol. The polyene product had a viscosity of 125 cps at 70° C and an average molecular weight of approximately 2,000.

EXAMPLE 12

1 kilogram of poly(propylene ether) glycol commercially available from Union Carbide under the tradename "PPG 2025" was heated to 120° C in a round bottom flask. To this was added 120 ml. (20 percent excess) of acetic anhydride at such a rate that the temperature of the mixture was kept at 120°-140° C. Following the addition, the mixture was heated at 140° C for 4 hours. It was then cooled and diluted with an equal volume of chloroform, washed with 10 percent aqueous sodium carbonate, then with water. The organic layer was separated and the chloroform was removed by distillation. Infrared analysis of the purified material showed it to be the diacetate of the poly(propylene ether) glycol with no residual hydroxyl groups.

100 g. of this diacetate was put through the hot tube as in Example 11 except that the packing was glass helices instead of alumina and the temperature was 375° C. The product contained 64 percent of the theoretical amount of unsaturation expected after the elimination of acetic acid from both terminal acetoxy groups of the poly(propylene ether) glycol diacetate.

EXAMPLE 13

114 g. of hexol sold under the tradename "NIAX Polyol LS–490" by Union Carbide Chemicals Co. having a molecular weight of 684 was charged to a 1 liter 4 neck flask and heated to 110° C under vacuum and nitrogen for 1 hour. It was then cooled to approximately 60° C whereat 0.1 cc. of dibutyl tin dilaurate was added followed by slowly adding 83 g. (1 mole) of allyl isocyanate to keep the temperature in the range 70°–80 C during the addition. After addition, the reaction was allowed to continue for 1 hour at 70° C. The polymeric hexaene product obtained had an average molecular weight of approximately 1,200 and a viscosity of 300 centipoises at 70° C.

EXAMPLE 14

To a 1 liter 4 neck flask was charged 300 milliliters of dimethylformamide, 35 g. of tolylene-2,4-diisocyanate and 0.1 cc. of dibutyl tin dilaurate. A mixture of 11.6 g. of allyl alcohol and 22.8 g. of hexol commercially available from Union Carbide Chemical Co. under the tradename "NIAX Polyol Ls–490" having a molecular weight of 684 was slowly added to the flask. Temperature was kept at approximately 65° C during the addition and for a period of 1 hour. The polymeric product obtained had an average molecular weight of approximately 2,100.

EXAMPLE 15

To a 1 liter 4 neck flask was charged 100 cc. of dimethylformamide, 100 g. of tolylene-2,4-diisocyanate and 0.1 cc. dibutyl tin dilaurate. 58 g. of hexol, i.e. "NIAX Polyol Ls–490" by Union Carbide and 34 g. of allyl alcohol were mixed together and added dropwise to the flask. Before the addition to the flask was completed, the reaction, which was exothermic, gelled and the addition was discontinued.

A comparison of Examples 13, 14 and 15 shows that Example 13 is an improvement over Examples 14 and 15 in that it allows one to form polymer without the necessity of a solvent. A comparison of Examples 14 and 15 shows that when starting with a highly functional polyol using the diisocyanate/allyl alcohol technique one must operate in dilute solution to avoid premature crosslinking (i.e., gelation) which renders the polyene product useless as a curable liquid prepolymer. This problem is avoided completely by using the unsaturated monoisocyanate technique illustrated in Example 13.

EXAMPLE 16

In a 1 liter, 4 neck flask 220 g. of hexol commercially available from Union Carbide Chemicals Co. under the tradename "NIAX Polyol LS–490" (0.32 moles) and 0.1 cc. of dibutyl tin dilaurate was heated to 110° C under vacuum for 1 hour. After cooling in nitrogen to approximately 60° C, 80 g. of allyl isocyanate was added to the flask by means of a dropping funnel. The exothermic reaction produced a temperature of 100° C. When the addition was complete the reaction was continued at 70° C for 1 hour. The resulting triene polymer product had an average molecular weight of approximately 950 and a viscosity of 300 centipoises as measured on a Brookfield Viscometer at 70° C.

EXAMPLE 17

To a 1 liter 4 neck flask was charged 300 g. of a polyester diol (molecular weight 3232) sold under the tradename "RC Polyester S 101-35" by R. C. Division, Hooker Chemical Corp. and 0.1 cc. of dibutyl tin dilaurate. The flask was heated to 110° C of dibutyl tin dilaurate. The flask was heated to 110° C under vacuum and maintained thereat for 1 hour. The flask was cooled to approximately 60° C, nitrogen was admitted, and 7.7 g. allyl isocyanate and 8.1 g. of tolylene-2,4-diisocyanate was added by means of a dropping funnel to the reaction at a moderate rate. A maximum temperature of 90° C was needed. When the addition was complete the reaction was allowed to continue at 70° C for 1 hour. The thus formed solid polymeric product had an average molecular weight of approximately 6,800 and a viscosity of 13,600 centipoises when measured on a Brookfield Viscometer at 70° C.

EXAMPLE 18

To a 1 liter 4 neck flask heated at 110° 70°was charged 808 g. of a polyester diol (having a molecular weight 3232) sold under the tradename "RC Polyester S 101-35" by R. C. Division Hooker Chemical Corp. and 0.1 cc. dibutyl tin dilaurate. The flask was maintained under vacuum at 110° C for 1 hour. The flask was cooled to approximately 50° C and with nitrogen passing through, a mixture of 10 g. of allyl alcohol and 60 g. of tolylene-2,4-diisocyanate was added via a dropping funnel at a moderate rate. The reaction was allowed to continue for 15 minutes. A maximum temperature of 90°c8 C was produced by the exothermic reaction. The polymeric product obtained was a solid at room temperature but liquid at 70° C. The product had an average molecular weight of approximately 10,500 and a viscosity of 270,000 centipoises at 70° C.

EXAMPLE 19

Following the procedure of Example 12 and using necessary reactants, a polyene of the following formula was prepared:

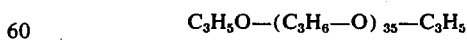

$C_3H_5O-(C_3H_6-O)_{35}-C_3H_5$

EXAMPLE 20

Following the procedure of Example 3, and using necessary reactants, a polyene of the following formula was prepared:

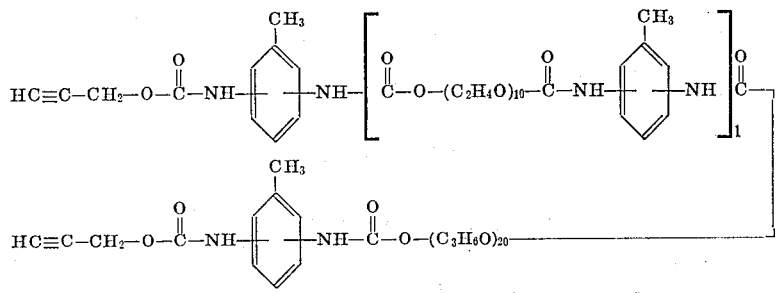

EXAMPLE 21

A crotyl-terminated polyurethane which contains two reactive double bonds per average molecule in a near terminal position was prepared following the general procedure of Example 3. The resulting polymeric polyene was found to have the following formula:

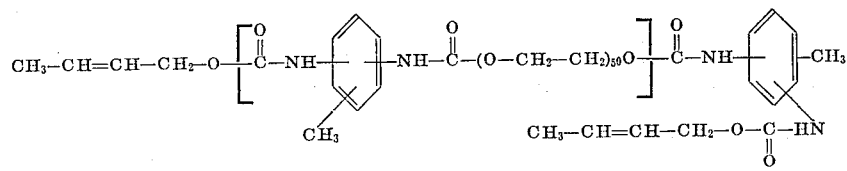

EXAMPLE 22

Following the procedure of Example 3, and using necessary reactants, a polyene of the following formula was prepared:

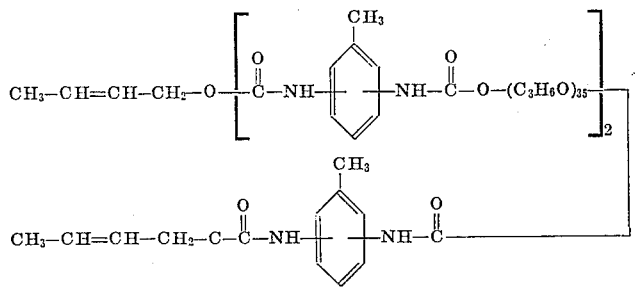

EXAMPLE 23

Following the procedure of Example 3, and using necessary reactants, a polyene of the following formula was prepared:

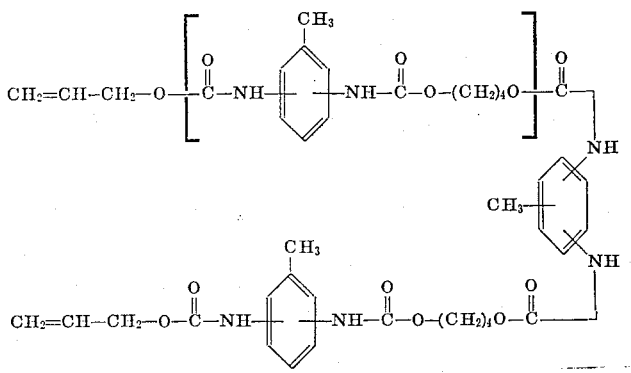

EXAMPLES 24-42

Following the general procedure of the prior examples, and using the necessary reactants, a series of polyenes having the formula: $X\left(B-A\right)_n B-X$ where $n$ is 1 or greater were prepared wherein the derivative members forming the polyenes are defined in the following:

| Example Number | Component [A] | Component [B] | Component [X] |
|---|---|---|---|
| 24 | HO—CH$_2$—C(CH$_2$Br)(CH$_2$Br)—CH$_2$—OH<br>Dibromoneopentyl glycol, DOW SA-1138, 3 moles. | 2,4-tolylene diisocyanate (CH$_3$—C$_6$H$_3$(NCO)$_2$) | CH$_2$=C(Cl)—CH$_2$OH<br>2-chloro-2-propenol-1, 2 moles. |
| 25 | HO—CH$_2$—C(CH$_2$Br)(CH$_2$Br)—CH$_2$OH<br>Dibromoneopentyl glycol, DOW SA-1138, 5 moles. | 2,6-/2,4-tolylene diisocyanate blend, 4 moles. | CH$_2$=CHOCH$_2$CH$_2$OH<br>2-vinyloxyethanol, 2 moles. |
| 26 | HO—CH$_2$—C(CH$_2$Br)(CH$_2$Br)—CH$_2$OH<br>Dibromoneopentyl glycol, DOW SA-1138, 40 moles. | 2,6-/2,4-tolylene diisocyanate blend, 6 moles.<br>OCNCH$_2$CH$_2$CH$_2$CH$_2$CH$_2$CH$_2$NCO<br>hexamethylene diisocyanate, 41 moles. | CH≡C—CH$_2$OH<br>1-phenyl-2-propynol-1, 2 moles. |
| 27 | HO—CH(CH$_3$)—CH$_2$—N(CH$_2$CH(CH$_3$)OH)—CH$_2$CH$_2$—N(CH$_2$CH(OH)CH$_3$)—CH$_2$CH—OH<br>N,N,N',N'-tetrakis(2-hydroxypropyl) ethylene diamine, Wyandotte, Quadrol, 2 moles. | CH$_3$—C$_6$H$_4$(CH$_2$NCO)(CH$_2$NCO)<br>1,3-xylylene diisocyanate, 7 moles. | 1-methyl-2-methylolcyclohexene, 6 moles. |
| 28 | HO—CH(CH$_3$)—CH$_2$—N(CH$_2$CH(CH$_3$)OH)—CH$_2$CH$_2$—N(CH$_2$CH(OH)CH$_3$)—CH$_2$CH—OH<br>N,N,N',N'-tetrakis(2-hydroxypropyl) ethylene diamine, Wyandotte, Quadrol, 2 moles. | OCNCH$_2$CH$_2$CH$_2$CH$_2$CH$_2$CH$_2$NCO<br>Hexamethylene diisocyanate, 7 moles, | CH$_2$=CHS—CH$_2$CH$_2$OH<br>Vinyl hydroxyethyl sulfide, 6 moles, |

| Example Number | Component [A] | Component [B] | Component [X] |
|---|---|---|---|
| 29 | $\text{HO-CHCH}_2$<br>$\|$<br>$\text{CH}_3$<br>$\text{HO-CH-CH}_2$<br>$\|$<br>$\text{CH}_3$<br>$\text{N-CH}_2\text{CH}_2\text{N}$<br>$\text{CH}_2\text{CHOH}$<br>$\|$<br>$\text{CH}_3$<br>$\text{CH}_2\text{CHOH}$<br>$\|$<br>$\text{CH}_3$<br><br>N,N,N¹,N¹-tetrakis (2-hydroxypropyl) ethylenediamine, Wyandotte Quadrol, 2 moles. | $\text{CH}_3$ with NCO groups (2,4-tolylene diisocyanate), 7 moles. | Di(3-benzylallylamine, 6 moles.<br>$[\text{H-N}(\text{CH}_2\text{CH}_2\text{CHCH=CH}_2)-\text{phenyl}]_2$ |
| 30 | Phosphorous based Polyol Pluracol® 208 Polyol, Wyandotte Chem. Corp., 2 moles. | Methylene bis(4-phenyl isocyanate), 3 moles.<br>OCN—⟨⟩—CH₂—⟨⟩—NCO | $\text{CH}_2-\text{OCH}_2\text{CH=CH}_2$<br>$\text{HOCH}_2-\text{C}-\text{CH}_2\text{CH}_3$<br>$\text{CH}_2-\text{OCH}_2\text{CH=CH}_2$<br><br>1,1,1-trimethylolpropanediallyl ether, 2 moles. |
| 31 | $\text{HO}-(\text{CH}_2\text{CH}_2\text{CH}_2\text{CH}_2\text{O})_{14}-\text{H}$<br><br>Polymeg® from Quaker Oats Co., 2 moles. | Methylene bis-(4-cyclohexyl isocyanate), 3 moles.<br>OCN—cyclohexyl—CH₂—cyclohexyl—NCO | $\text{HO-CH}_2-(\text{CH}_2)_8-\text{CH=CH}_2$<br><br>Omega-undecylenyl alcohol. |
| 32 | $\text{HO-C-CF}_2\text{CF}_2-\text{C-OH}$<br>$\|\| \quad\quad\quad \|\|$<br>$\text{O} \quad\quad\quad\quad \text{O}$<br><br>Tetrafluorosuccinic acid, 10 moles. | Diphenylsilanediol, 9 moles.<br>$\text{HO-Si(phenyl)}_2\text{-OH}$ | $\text{HO-CH}_2\text{CH}_2-\text{N-CH}_3$<br>$\|$<br>$\text{CH}$<br>$\|\|$<br>$\text{CH}_2$<br><br>N-Methyl-N-vinyl ethanolamine, 2 moles. |
| 33 | 1,2-cyclohexanediol, 5 moles.<br>cyclohexane with two OH groups | 1,5-naphthalene diisocyanate, 6 moles.<br>naphthalene with NCO groups | $\text{HO-CH}_2-\text{C=CH}_2$<br>$\|$<br>pyridyl<br><br>2-(2-pyridyl)-allyl alcohol. |

| Example Number | Component [A] | Component [B] | Component [X] |
|---|---|---|---|
| 34 | $HO-CH_2-\overset{CH_3}{\underset{}{CH}}-OH$<br>Propylene glycol, 6 moles. | 1,3-benzenedicarboxylic acid (isophthalic acid structure with two COOH on benzene)<br>Isophthalic acid, 5 moles. | $OCN-CH_2-CH=CH-$(phenyl)<br>3-phenylallyl isocyanate, 2 moles. |
| 35 | Diphenylsilanediol $(C_6H_5)_2Si(OH)_2$, 6 moles. | $OCN-$(cyclohexyl)$-CH_2-$(cyclohexyl)$-NCO$<br>Methylene bis (4-cyclohexyl isocyanate), 5 moles. | $OCN-CH_2-\overset{CH_3}{\underset{}{C}}=CH_2$<br>2-methyl-allyl isocyanate, 2 moles. |
| 36 | $H_2N-(CH_2CH_2NH)_{30}-CH_2CH_2NH_2$<br>Poly(ethylene imine), 1 mole. | None. | $OCN-(CH_2)_8-CH=CH_2$<br>9-decenyl isocyanate, 3 moles. |
| 37 | $\underset{CH_2Br}{\overset{CH_2Br}{HO-CH_2-C-CH_2-OH}}$<br>Dibromoneopentyl glycol, DOW SA-1138, 3 moles, | $OCN-(CH_2)_6-NCO$<br>Hexamethylene diisocyanate, 4 moles, | $HO-CH_2-\underset{Cl}{\overset{}{C}}=CH_2$<br>2-chloro-2-propen-1-ol, 2 moles, |
| 38 | $H_2N-CH_2-$(cyclohexyl)$-CH_2NH_2$<br>1,4-di(aminomethyl)cyclohexane, 10 moles, | $HOOC-(CH_2)_4-COOH$<br>Adipic acid, 11 moles, | $H_2N-CH_2-\underset{CH_2}{\overset{}{C}}=CH_2$<br>$\overset{}{\underset{}{}}$ (p-methoxyphenyl group with OCH_3)<br>2-(P-methoxybenzyl) allyl amine, 2 moles, |
| 39 | $HO-CF_2CF_2-OH$<br>Tetrafluoroethylene glycol, 3 moles, | Trimellitic anhydride (benzene with COOH and anhydride), (1 mole), | $HO-CH_2-$(phenyl)$-O-CH=CH_2$<br>4-vinyloxybenzyl alcohol, 3 moles, |

| Example Number | Component [A] | Component [B] | Component [X] |
|---|---|---|---|
| 40 | HO−(−CH$_2$CH$_2$O−)$_2$−H$_{30}$ Poly(ethylene ether) glycol, 1 mole. | None. | OCN−(−CH$_2$−)$_3$−CH=CH$_2$ 4-pentenyl isocyanate, 2 moles. |
| 41 | Pluracol® 208, phosphorus-based polyol, Wyandotte Chem. Co., 1 mole. | DDI® Diisocyanate Dimer Acid-based diisocyanate, General Mills Co., 2 moles. | CH$_2$OCH$_2$CH=CH$_2$<br>HO−CH$_2$−C−C$_2$H$_5$<br>CH$_2$OCH$_2$CH=CH$_2$<br>1,1,1-trimethylolpropanediallyl ethel, 2 moles. |
| 42 | CH$_3$<br>HO−CH−CH$_2$   CH$_2$CH−OH<br>          \\N−CH$_2$CH$_2$−N/<br>HO−CH−CH$_2$   CH$_2$CH−OH<br>CH$_3$           CH$_3$<br>N,N,N',N'-tetrakis(2-hydroxypropyl)-ethylene diamine, Wyandotte Co., Quadrol®, 1 mole. | OCN−CH−(−CH$_2$−)$_4$−CH$_2$−NCO<br>         CH$_3$<br>2,7-di(isocyanato)-heptane, 4 moles. | HO−CH$_2$−CH$_2$−N−C<br>                            CH  CH−CH<br>                            CH$_2$<br>N-(2-furyl)-N-vinyl ethanolamine, 4 moles. |

PHOTOCURING PROCESS

Example 43

0.01 mole of the allyl-terminated liquid prepolymer A was charged to a 2 oz. glass bottle along with a stoichiometric amount to react with the allyl groups, i.e. 0.0066 moles, of trimethylolpropane tris (β-mercaptopropionate) having a molecular weight of 398, and about 2 percent total weight of benzophenone. The liquid reactants were stirred together and heated for one-half hour at 140° C. Thereafter the reactants were photoexposed to type RS Sunlamp under ambient conditions of room temperature and pressure. After exposure, the liquid reactants became solid, self-supporting, cured, odorless, elastomeric polythioether product resulted.

EXAMPLE 44

Example 43 was repeated except that 0.0033 moles of trimethylolpropane tris (β-mercaptopropionate) having a molecular weight of 398 was used. The mixture, upon photocuring formed a solid, odorless, self-supporting, cured elastomeric polythioether polymer.

EXAMPLE 45

0.005 moles of the allyl-terminated liquid Prepolymer E was charged to a 2 oz. glass jar along with a stoichiometric amount of a polythiol to react with the allyl groups in Prepolymer E, 0.0036 moles of trimethylolpropane tris (β-mercaptopropionate), and 2 percent total weight of benzophenone. The liquid reactants were stirred together briefly at room temperature and allowed to stand under ambient conditions. After exposure to ultraviolet light, a solid, odorless, self-supporting, cured elastomeric polythioether polymer resulted.

EXAMPLE 46

Example 45 was repeated except that 0.0027 moles of pentaerythritol tetrakis (β-mercaptopropionate) was substituted for the trimethylolpropane tris (β-mercapto-propionate). After photocuring a cured solid, odorless, self-supporting, elastomeric polythioether polymer resulted.

EXAMPLE 47

0.005 moles of the HC≡C− terminated liquid Prepolymer B was charged to a 2 oz. glass jar along with a stoichiometric amount to react with the HC≡C− groups in Prepolymer B of trimethylolpropane tris (β-mercaptopropionate) (0.0033 moles), and 2 percent total weight of benzophenone. The reactants were stirred together and after photoexposure to ultraviolet light, a cured solid, odorless, self-supporting, elastomeric polythioether polymer resulted.

EXAMPLE 48

0.005 moles of the allyl-terminated liquid Prepolymer F was charged to a 2 oz. glass jar along with a stoichiometric amount to react with the allyl groups of the Prepolymer, i.e. 0.0033 moles of trimethylolpropane tris (β-mercaptopropionate) having a molecular weight of 398, and 2 percent total weight of benzophenone. The liquid reactants were stirred together. Thereafter the reactants were photocured under ambient conditions. The reactants formed a solid, odorless, self-supporting, cured elastomeric polythioether polymer.

The following examples in Table I show curing by ultraviolet light. In all the Examples in Table I, 10 g. of the allyl-terminated liquid polyene prepolymers were charged to an open glass jar to which was added a stoichiometric amount of a polythiol necessary to react with the allyl groups of the prepolymer and any UV sensitizer or activator employed. The reactants were stirred briefly and then placed outdoors for indirect photoexposure to the sunlight. Examples were checked periodically to determine the extent of cure.

TABLE I

| Example Number | Polyene prepolymer | Polythiol [1] | Polyene: polythiol mole ratio | UV accelerator | UV accelerator (g.) | Curing observations |
|---|---|---|---|---|---|---|
| 49 | G | P-33 | 1=0.66 | None | | Cured to an odorless solid in 4 wks. |
| 50 | G | Q-43 | 1=0.5 | do | | Cured to an odorless solid in 1 wk. |
| 51 | G | P-43 | 1=0.66 | Acetone | 0.2 | Cured to an odorless solid in 1 wk. |
| 52 | G | Q-43 | 1=0.5 | do | 0.2 | Cured to an odorless solid in 1 day. |
| 53 | G | Q-43 | 1=0.5 | Methyl ethyl ketone. | 0.2 | Cured to an odorless solid in 4 days. |
| 54 | H | Q-43 | 1=0.5 | Acetophenone | 0.5 | Cured in 1 hr. |
| 55 | H | Q-43 | 1=0.5 | Cyclohexanone | 0.5 | Cured in 3 hrs. |
| 56 | H | P-43 | 1=0.5 | Acetophenone | 0.5 | Cured in 1 hr. |
| 57 | I | Q-43 | 1=0.5 | do | 0.5 | Cured to an odorless solid in 15 minutes. |
| 58 | I | Q-43 | 1=0.5 | do | 0.5 | No cure in 19 hrs. in dark room. |

[1] P-33=Trimethylolpropane tris (β-mercaptopropionate); Q-43=Pentaerythritol tetrakis (β-mercaptopropionate).

EXAMPLE 59

1510 g. of a commercially available polyoxypropylene glycol sold under the tradename "Pluracol P 2010" by Wyandotte Chemical Corp. was charged to a resin kettle maintained under a nitrogen atmosphere and equipped with a condenser, stirrer, thermometer and gas inlet and outlet. The reactant was degassed at room temperature for 3 hours. 265.4 g. of an 80–20 percent isomer mixture of tolylene-2,4-diisocyanate and tolylene-2,6-diisocyanate respectively sold under the tradename "Mondur TD 80" was charged to the kettle and the kettle was heated for 2 hours at 120° C with stirring under nitrogen. Thereafter, 116.9 g. (2 moles) of allyl alcohol was added to the kettle and the mixture was refluxed for 16 hours at 120° C. Excess allyl alcohol was stripped by vacuum at 115° C for 23 hours. The thus-formed $CH_2 = CH-$ terminated polyene prepolymer had a molecular weight of approximately 2,460–2,500, and a viscosity of 16,000 cps as measured on a Brookfield Viscometer at 30° C.

0.005 moles of the thus-formed polyene prepolymer were charged to a 2 oz. glass jar along with a stoichiometric amount of the polymeric dithiol prepared in Example 65. 0.5 g. of acetophenone (a UV photoinitiator) was charged to the glass jar and the mixture was immediately stirred. Thereafter the mixture was placed outdoors for UV curing. In 24 hours a solid, self-supporting, odorless, cured elastic polymer resulted.

EXAMPLE 60

4.5 g. (0.02 moles) diallyl adipate was charged to a 2 oz. glass bottle along with a stoichiometric amount of a polythiol to react with the $CH_2 = CH-$ groups in the diallyl adipate, i.e. 4.9 g. (0.01 moles) of pentaerythritol tetrakis (β-mercaptopropionate) and 0.2 g. of acetophenone (a UV sensitizer). The reactants were stirred briefly and then placed outdoors in the sunlight at ambient conditions. A self-supporting, solid, odorless, cured polythioether polymer resulted in less than 30 minutes.

EXAMPLE 61

Example 60 was repeated except that 0.02 moles of diallyl phthalate was substituted for the diallyl adipate. A self-supporting, solid, odorless, cured polythioether polymer product resulted in less than 1 hour.

EXAMPLE 62

Example 60 was repeated except that 0.02 moles of diallyl succinate was substituted for the diallyl adipate. A self-supporting, solid, odorless, cured polythioether product resulted in 30 minutes.

EXAMPLE 63

Example 60 was repeated except that 0.02 moles of 2,2-diallyloxypropane was substituted for the diallyl adipate. A self-supporting, solid, odorless, cured polythioether polymer product resulted in less than 1 hour.

EXAMPLE 64

1.9 g. (0.02 moles) diallyl amine was charged to a 2 oz. glass bottle along with a stoichiometric amount of polythiol to react with the vinyl groups in the diallyl amine, i.e. 4.9 g. (0.01 moles) of pentaerythritol tetrakis (β-mercaptopropionate) and 0.5 g. acetophenone (a UV activator). The reactants were stirred briefly and placed outdoors in the sunlight under atmospheric conditions. In less than 15 minutes a self-supporting, solid, odorless, cured, clear, rubbery polythioether polymer resulted.

The following shows another example of the curing of a polymeric thiol-containing compound and a vinyl-terminated polymer.

EXAMPLE 65

1.5 moles of β-mercaptopropionic acid, 0.5 moles of a commercially available poly(propylene ether) glycol sold under the tradename "Pluracol P-2010" by Wyandotte Chemical Corp. and 0.1 g. p-toluenesulfonic acid and 50 ml. benzene were charged to a resin kettle maintained under a nitrogen atmosphere and equipped with a condenser, stirrer, thermometer and gas inlet and outlet. The mixture was heated and the benzene-water azeotrope was collected. The actual amount of water collected amounted to 17.5 g. The reaction was vacuum-stripped for several hours at 70° C to remove benzene. The resulting polythiol polymer had a molecular weight of about 2,210–2,230 and an average functionality of 2 and was collected for use herein.

659 g. (0.145 moles) of a poly(propylene ether) triol commercially available from Wyandotte Chemical Corp. under the tradename "Pluracol TPE 4542" having a molecular weight of about 4,500 and a hydroxyl number of 37.1, and 0.3 g. of dibutyl tin dilaurate were charged to a resin kettle maintained under a nitrogen atmosphere and equipped with a condenser, stirrer, thermometer and gas inlet and outlet. The reactants were maintained at 110° C for 1 hour and then cooled under nitrogen to room temperature. 25.2 g. (0.435 moles) of allyl alcohol was added to the kettle followed by 75.7 g. (0.435 moles) of an 80–20 percent isomer mixture of tolylene-2,4-diisocyanate and tolylene 2,6-diisocyanate respectively sold under the tradename "Mondur TD 80". The temperature reached 55° C in 6 minutes. A sample was titrated for NCO resulting in 6.02 mg. NCO/g. after 20 minutes. After 1 hour the NCO titration showed 0.997 mg. NCO/g. The polyene polymer had a molecular weight of about 5,200 and an average functionality of 3 and was vacuum stripped at 70° C for 1 hour and then collected. 0.003 moles of the polythiol polymeric material formed supra were charged to a 2 oz. glass jar along with 0.002 moles of the allyl-terminated polyene polymer formed herein and 0.5 g. acetophenone. The reactants were stirred briefly and then placed outdoors under atmospheric conditions. In one-half hour a self-supporting, solid, odorless, clear, cured polythioether polymer product resulted.

EXAMPLE 66

3 g. of a linear saturated hydrocarbon backbone ethylene/propylene/non-conjugated diene terpolymer commercially available under the tradename "Nordel" by E. I. du-Pont de Nemours Co. which had been visbroken until it had a reduced specific viscosity of 0.99 and contained 0.4 vinyl, 6.4 trans and 0.4 vinylidene unsaturated groups per 1000 carbon atoms, was dissolved in 100 ml. of benzene in a glass jar. A 50 percent excess over the stoichiometric amount, i.e. 0.0006 moles (0.3 g.) of pentaerythritol tetrakis($\beta$-mercaptopropionate) was added to the jar in addition to 0.5 g. acetetophenone. The glass jar was placed in the sunlight outdoors under atmospheric conditions. After 24 hours the benzene had substantially evaporated leaving a gelatinous polymeric precipitate. Acetone was added to precipitate more polymer. The polymer was filtered off, washed with acetone and dried in a vacuum oven at 60° C.

2.3 g. of the above polythioether polymer product was extracted with benzene along with a "control" sample of the starting visbroken "Nordel" material. The "control" sample showed a gel content (benzene insoluble) of 3.4 percent whereas the cured (crosslinked) solid polythioether polymer product had a gel content of 82.8 percent.

EXAMPLE 67

0.5 moles of a carboxyl-terminated polyisobutylene, commercially available from Enjay Chemical Co. having a molecular weight of about 1,800, 0.1 g. of p-toluenesulfonic acid catalyst), 1.5 moles of allyl alcohol were charged to a resin kettle maintained under a nitrogen atmosphere and equipped with a condenser, stirrer, thermometer and gas inlet and outlet. The mixture was heated at reflux for 2 hours, then 50 ml. benzene added and the benzene-water azeotrope was collected. The actual amount of water collected amounted to 17.5 g. The reaction was vacuum stripped for several hours at 70° C to remove benzene and any unreacted allyl alcohol.

0.005 moles of the thus formed polyene (9.6 g.), 0.0025 moles (1.2 g.) of pentaerythritol tetrakis($\beta$-mercaptopropionate) and 0.5 g. of aceptophenone were charged to a 2 oz. glass jar and briefly stirred. The jar was placed out-doors under ambient conditions. After one-half hours, a self-supporting, solid, odorless, cured elastomeric product resulted.

EXAMPLE 68

643 g. (0.32 moles) of a commercially available poly(propylene ether) glycol sold under the tradename "Pluracol P 2010" by Wyandotte Chemical Co. was degassed at room temperature for 1 hour and then charged to a resin kettle maintained under a nitrogen atmosphere and equipped with a condenser, stirrer, thermometer and gas inlet and outlet. 111.4 g. (0.64 moles) of a 80–20 percent isomer mixture of tolylene-2,4-diisocyanate and tolylene-2,6-diisocyanate respectively sold under the tradename "Mondur TD 80" was added to the kettle. After 45 minutes, the temperature was raised to 120° C and the reaction was continued for 50 minutes. A sample was removed and titrated for NCO resulting in 33.54 mg. NCO/g. 62.7 g. of diallyl amine was added at 105° C and the reaction was continued for 10 minutes. A sample was titrated resulting in an NCO content of 1.20 milligrams NCO/g. A vacuum was applied to the kettle for 1 hour at 90° C followed by cooling under nitrogen. The resulting product had a molecular weight of about 2,540–2,580 and an ene functionality of 4.

10 g. of the thus formed polymer was charged to a 2 oz. glass jar along with 2 g. of pentaerythritol tetrakis ($\beta$-mercaptopropionate and 0.5 g. acetophenone. The liquid reactants were briefly stirred together and placed out-doors under ambient conditions. Within 15 minutes a solid, odorless, elastomeric cured polythioether product was obtained.

EXAMPLE 69

215 g. of poly(ethylene imine) commercially available from Dow Chemical Co. under the tradename "Montrek 18" along with 41.5 g. allyl isocyanate was charged to a resin kettle maintained under a nitrogen atmosphere and equipped with a condenser, stirrer, thermometer and gas inlet and outlet. The reactants were maintained at 70° to 80° C during addition. The reaction was continued for 1 hour at 70° C.

10 g. of the thus formed polymer were charged to a 2 oz. glass jar along with 1.5 g. of pentaerythritol tetrakis ($\beta$-mercaptopropionate) and 0.5 g. of acetophenone. The mixture was briefly stirred and placed outdoors in the sun light at ambient conditions. Within 2 hours a solid, self-supporting, odorless, cured polymer product was formed.

The example was repeated using 180 g. of poly(ethylene imine) and 29.1 g. of allyl isocyanate under the same conditions and procedure. 10 g. of this polyene product was reacted with 2.1 g. of pentaerythritol tetrakis ($\beta$-mercaptopropionate) and 5 g. of acetophenone. The mixture was briefly stirred and placed outdoors in the sun light at ambient conditions. Within 2 hours a solid, self-supporting, odorless, cured polymer product was formed.

EXAMPLE 70

The polymeric polythiol (0.003 moles, $f$=2) from Example 65 was admixed with a stoichiometric amount (0.002 moles, $f$=3) of a monomeric polyene, glycerol trioleate (triolein, molecular weight 885) and 0.5 g. acetophenone. The jar containing the reactants after mixing was placed in the sunlight under ambient conditions. Within one-half hour the liquid mixture was converted to a self-supporting, solid, odorless, clear rubbery cured polythioether product.

The following example shows the operability of the instant invention when the polyene contains acetylenic linkages.

EXAMPLE 71

400 g. (0.20 moles) of a commercially available liquid polymeric diisocyanate sold under the tradename "Adiprene L–100" by E. I. duPOnt de Nemours & Co. was charged to a dry resin kettle maintained under a nitrogen atmosphere and equipped with a condenser, stirrer, thermometer and gas inlet and outlet. 25.2 g. (0.45 moles) of propargyl alcohol was charged to the kettle and the reaction was continued for 17 hours with stirring at 100° C. Thereafter the nitrogen atmosphere was removed and the kettle was evacuated 15 hours at 100° C. 10 g. of the propargyl terminated liquid prepolymer, 3.0 g. of pentaerythritol tetrakis ($\beta$-mercaptopropionate) and 0.5 g. acetophenone were admixed together in a 2 oz. glass jar, stirred briefly and placed outdoors under ambient conditions. Within 2 ½ hours a solid, odorless, self-supporting, cured elastomeric polymer product resulted.

EXAMPLE 72

40 g. of Prepolymer I and 10 g. of a filler sold commercially under the tradename "Hi Sil 233" by Columbia Southern Chemical Corp. were charged under nitrogen to a 200 ml. round bottom 3 necked flask maintained under a nitrogen atmosphere and mixed thoroughly. The flask was heated by a water bath to 60° C under full vacuum for 2 hours. The flask was then allowed to cool under vacuum. 4 g. of pentaerythritol tetrakis ($\beta$-mercaptopropionate) was charged to the flask under nitrogen and the reaction was stirred continuously. The reaction was then exposed to ultraviolet light from the atmosphere outdoors and a solid, cured, odorless elastomeric product resulted within 15 minutes.

EXAMPLE 73

125 g. of Prepolymer E from Example 5 herein was charged to a Erlenmeyer flask equipped with a magnetic stirrer and connected by tubing to another Erlenmeyer flask containing 54 g. of trimethylolpropane tris ($\beta$-mercaptopropionate). The system was evacuated (0.05 mm.) while heating the polymer to 100° C with stirring. After 2 hours all bubbling ceased. An additional one-half hour evacuation was performed. Thereafter the trimethylolpropane tris($\beta$-mercaptopropionate) was poured into the flask containing Prepolymer E under nitrogen. After stirring to insure good mixing, heat was removed and the reaction was continued under nitrogen for 4 days. No curing was observed. A sample of the unreacted material was removed from the Erlenmeyer flask under nitrogen and placed in a 2 oz. jar. The sample was exposed to ambient conditions outdoors and in about 2 minutes evidence of curing (viscosity change) was observed. Within 15 minutes, an odorless, solid elastomeric, cured polymer product was obtained, under UV light.

EXAMPLE 74

10 g. of Prepolymer E from Example 5 was added to each of three 2 oz. jars. To one of the jars was added 3 ml. of benzene containing 0.5 percent based on the weight of the prepolymer of an antioxidant sold under the tradename "Santonox" commercially available from Monsanto Chemical Co. To another of the jars containing Prepolymer E was added 3 ml. of benzene containing 0.5 percent based on the weight of the prepolymer of an antioxidant sold under the tradename "Dalpac FG" commercially available from Hercules Powder Co. To the third jar was added 3 ml. of benzene as a control. To blend the components the jars were heated in a forced draft oven set at 150° C for 25 minutes with frequent stirring. The jars were withdrawn from the oven and 1.3 g. of trimethylolpropane tris (β-mercaptopropionate) was added to each of the jars and curing was initiated indoors under ambient conditions. The control run, without any antioxidant present, cured within one-half hour to a solid elastomeric polymer product. The example containing "Dalpac FG" cured to a solid polymer product after 12 days whereas the sample containing "Santonox" required more than 2 weeks before a solid self-supporting, cured polymeric product resulted.

The polyenes used in the instant invention may be used as blends or mixtures of monoenes or polyenes having the same or different functionalities so long as the average functionality of the blend or mixture is at least 2. Similarly, the polythiols used herein may be used as blends or mixtures of monothiols or polythiols having the same or different functionalities as long as the average functionality of the blend or mixture is at least 2.

The polyene/polythiol mole ratio is selected so as to provide a solid final cured product, i.e., one that is nonflowing and structurally self-supporting under ambient conditions. In typical cases, as shown by the examples, this ratio can be about 0.2 to 5 moles thiol groups per mole ene groups. In general the mole ratios significantly above or below 1 tend to give a high proportion of chain extension or grafting whereas mole ratios near 1 give predominantly chain extension and crosslinking. Occasionally, however, ratios necessary to give a solid as aforesaid may lie outside the stated range, and experimentation may be necessary to determine a suitable ratio to give a solid. This experimentation is easily carried out, and offers no difficulties to those skilled in the art.

The following Examples 75–80 show the ability to use mixtures of the polythiols and how to empirically determine the amount of polythiol necessary to form cured solid self supporting polymeric products by the instant invention.

As shown in Examples 75–80, 30 g. of Prepolymer I from Example 8 were admixed with varying ratios of a mixture of polythiols and cured by ultraviolet light in the presence of acetophenone as a UV photoinitiator.

EXAMPLE 81

The following formulations were made up:

| Ingredients | Formulation No. I Parts | Formulation No. II Parts |
|---|---|---|
| Prepolymer D from Example 4 | 100 | 100 |
| TiO$_2$ (pigment) | 4 | 4 |
| Unimal 507 (kaolin clay) | 60 | 85 |
| Unimal 303 (kaolin clay) | 25 | 0 |
| Thickening agent (75% silicia gel-25% asbestos fibers) | 4 | 4 |
| Pentaerythritol tetrakis (mercaptopropionate) | 10 | 10 |

The above formulations were briefly admixed for homogeneity and thereafter air cured indoors. Formulation I cured in approximately 6 hours to an elastomeric sealant whereas Formulation II cured in 2 days to an elastomeric sealant. Curing was accomplished more rapidly when the samples were placed outdoors in sunlight after mixing.

EXAMPLE 82

10 g. of Prepolymer D were charged to a 2 oz. glass jar along with 0.7 g. of ethylene glycol bis (mercaptopropionate), 2.2 g. pentaerythritol tetrakis (mercaptopropionate), and 0.5 g. benzophenone. The reactants were briefly stirred and then placed between two pieces of glass plate each of 5 mil thickness. The glass plates were pressed together by hand to insure good adhesion, and then exposed to a Type RS Sunlamp at a surface radiation intensity of 4,000 microwatts/am$^2$ for 5 minutes. An attempt was made to pull the glass plates apart. The glass broke before the adhesive was destroyed.

EXAMPLE 83

50 g. of Prepolymer H along with 5.0 g. of pentaerythritol tetrakis (mercaptopropionate), and 0.5 g. of benzophenone were stirred together briefly in a glass jar and then poured into an aluminum mold in the shape of a shallow dish. The mold was photocured by the procedure of Example 82 after which the mold was torn away from the molded article which set to a solid in the exact shape of the mold.

EXAMPLE 84

0.005 moles of Prepolymer E from Example 5 was charged to a 2 oz. glass jar along with 0.0033 moles of trimethylolpropane tris (β-mercaptopropionate) and 0.5 g. of acetophenone. The reactants were stirred briefly and then coated on to a piece of 17 pt. clay coated paper by means of a No. 10 rod. The paper was then paced outdoors in the sun light. After 10 mins. a clear solid coating resulted on the paper. The same technique was used successfully to coat cellophane, aluminum foil, steel plate stock, "Mylar" polyester film, plywood, and a concrete block of the type used in building construction.

EXAMPLE 85

20 g. of the polymeric product from Example 9 was mixed with 2.2 g. of pentaerythritol tetrakis (β-mercaptopropionate)

| Example Number | Polyene polymer [1] | Polythiol mixture (g.) Q-43 [2] | Polythiol mixture (g.) E23 [3] | Acetophenone (g.) | Outdoor curing site | Curing time (mins.) | Shore A hardness | Self-support structure |
|---|---|---|---|---|---|---|---|---|
| 75 | I | 2.9 | 0 | 0.5 | X | 7 | 40 | Yes. |
| 76 | I | 2.3 | 0.6 | 0.5 | X | 7 | 25 | Yes. |
| 77 | I | 1.7 | 1.2 | 0.5 | X | 9½ | 21 | Yes. |
| 78 | I | 1.2 | 1.7 | 0.5 | X | 9¾ | 7 | Yes. |
| 79 | I | 0.6 | 2.3 | 0.5 | X | 52½ | 0 | Yes. |
| 80 | I | 0 | 2.9 | 0.5 | X | ([4]) | | No. |

[1] Polyene prepolymer I from Example 8.
[2] Q-43=pentaerythritol tetrakis (β mercaptopropionate) commercially available from Carlisle Chemical Co.
[3] E-23=ethylene glycol bis (β mercaptopropionate).
[4] No cure.

commercially available from Carlisle Chemical Co. under the tradename "Q43" and 0.5 g. of acetophenone in a 2 oz. aluminum tray, stirred briefly and cured by irradiating with ultraviolet light from a Sylvania Sun lamp. Within 4 minutes a solid, odorless, elastomeric product resulted.

EXAMPLE 86

20 g. of the polymeric product from Example 10 was mixed in an aluminum dish with 2.2 g. of pentaerythritol tetrakis ($\beta$-mercaptopropionate) commercially available from Carlisle Chemical Co. under the tradename "Q43" and 0.5 g. of acetophenone. The mixture was irradiated for 3 minutes by ultraviolet light from a Sylvania Sun lamp. The sample cured to a tack-free solid which had a color of less than 1 on the Gardner Scale. After exposure in a Fadeometer for 47.2 hours, the color increased to a value of 4 on the Gardner Scale.

A similar polymer prepared from "PPG-2025," tolylene-2,4-diisocyanate and allyl alcohol, cured with pentaerythritol tetrakis ($\beta$-mercaptopropionate) and acetophenone by irradiation with ultraviolet light also had a Gardner color of less than 1. However, after 47.2 hours in the Fadeometer the Gardner color rose to 13.

EXAMPLE 87

10.25 g. of the polymeric product from Example 13 and 6.35 g. of pentaerythritol tetrakis ($\beta$-mercaptopropionate) were admixed along with 0.4 g. acetophenone in a beaker. A film approximately 0.035 inch thick (4.5 inch square) was spread on a glass plate and cured by irradiating it for 5 minutes with ultraviolet light from a Westinghouse sun lamp 8 to 10 inches above the film. The resultant cured product had a tensile strength of 368 psi and an elongation at failure of 27 percent. Its Shore A hardness was 80 to 85.

EXAMPLE 88

10 g. of the polymer product from Example 18 was melted and 10 g. of solvent (equal volumes of toluene and 2-ethoxyethyl acetate) was added to lower the viscosity of the melt. To this solution was added 0.35 g. of pentaerythritol tetrakis ($\beta$-mercaptopropionate). The solution was mixed and a 0.035 inch sheet was cast and irradiated for 30 minutes with a Westinghouse sun lamp. The resultant, clear, cured product crystallized slowly to a white opaque material which had a tensile strength of 6,310 psi and an elongation at failure of 720 percent. It had a Shore A hardness of over 100.

EXAMPLE 89

6 g. of glycerol trioleate (Armour Industrial Chemical Co.) and 2.4 g. of pentaerythritol tetrakis ($\beta$-mercapto-propionate) were dissolved in an ethanol-benzene solution and placed in an aluminum tray. 1.0 g. of acetophenone was added and admixed and the mixture was exposed to the ultraviolet rays of the sun for 3 days. A cured solid film was formed in 3 days.

EXAMPLE 90

10.6 g. of decaglycerol dioleate (Drew Chemical Corp.) and 2.0 g. of pentaerythritol tetrakis ($\beta$-mercaptopropionate) were dissolved in ethanol, 1.0 g. of acetophenone was admixed therewith and the mixture in an aluminum tray was placed outdoors in the sunlight. After 3 days a cured film was formed.

EXAMPLE 91

5.6 g. of decaglyercol decaoleate (Drew Chemical Corp.) and 2.0 g. of pentaerythritol tetrakis ($\beta$-mercaptopropionate) were admixed in an ethylene-benzene solution in an aluminum tray. 1.0 g. of acetophenone was added to the mixture and the mixture was placed in the sunlight. After 3 days a cured film resulted.

EXAMPLE 92

5.5 g. of decaglycerol decaoleate (Drew Chemical Corp.) and 2.0 g. of ethylene glycol bis ($\beta$-mercaptopropionate) commercially available from Carlisle Chemical Co. under the tradename "E-23" were dissolved in an ethanol-benzene solution in an aluminum tray. 1.0 g. of acetophenone was added to the mixture and the mixture was placed in the sun. After 3 days a semi-solid cured film resulted.

EXAMPLE 93

5.2 g. of decaglycerol dioleate (Drew Chemical Corp.) and 2.0 g. of ethylene glycol bis ($\beta$-mercaptopropionate) were dissolved in ethanol in an aluminum tray. 1.0 g. of acetophenone was added to the mixture and the mixture was placed in the sun. After 3 days the product had not solidified to a cross-linked network.

EXAMPLE 94

94.5 g. of dimer acid commercially available from Emery Industries Inc. under the tradename "Empol 1010" and 103.5 g. of allyl alcohol were admixed in benzene in a 2 neck flask. The reaction was heated gently for 19 hours at 80° C at which time it was determined by titration that less than 6 percent of the carboxyl group content was unreacted. The reaction was discontinued and the reactants were washed with water. The thus formed emulsion was salted out thoroughly, the benzene layer was separated and dried to remove residual moisture. The benzene was distilled off in vacuum to obtain the diallyl ester of dimer acid.

The diallyl ester of the dimer acid product was admixed with "Q-43" in a 1:1 mole ratio and 1.0 g. acetophenone in an aluminum tray and cured in the sun. After 2 hours a cured solid product resulted.

The curing example was repeated except that the mole ratio of the diallyl ester of dimer acid to "Q-43" was 2:1. The cured product was harder than the product obtained under the 1:1 mole ratio of diallyl ester to "Q-43."

14 g. of dimer acid, 6 g. of pentaerythritol tetrakis ($\beta$-mercaptopropionate) and 1.0 g. of acetophenone were mixed in an aluminum tray. The mixture was placed in the sun. After 22 hours the product had not solidified to a crosslinked network.

EXAMPLES 95-117

| Sample Number | Polyene | Source of Polyene | Photocuring*** rate accelerator | Polythiol* | UV thru cure** rate mils/min. | Shore A hardness, UV cured |
|---|---|---|---|---|---|---|
| 95 | 1,2,4-trivinylcyclohexane | Aldrich Chem. Co., Inc. | Benzophenone | Q-43 | 23.3 | 70 |
| 96 | 1,5-hexadiene | Aldrich Chem. Co., Inc. | do | Q-43 | 35.0 | 60 |
| 97 | Diallyl terephthalate | Chemicals Procurement Lab. Inc. | do | Q-43 | 21.0 | 60 |
| 98 | Diallyl oxalate | Monomer-Polymer Labs., Inc. | do | Q-43 | 5.0 | 80 |
| 99 | Diallyl 1,4-cyclohexane-dicarboxylate | Monomer-Polymer Labs., Inc. | do | Q-43 | 3.0 | 70 |
| 100 | Tetraallyl orthosilicate | Aldrich Chem. Co., Inc. | do | Q-43 | 8.8 | 60 |
| 101 | Diallyl diphenylsilane | Chemicals Procurement Lab. Inc. | do | Q-43 | 43.7 | 75 |
| 102 | Diallyl allyl phosphonate | Aldrich Chem. Co., Inc. | do | Q-43 | 17.5 | 90 |
| 103 | Diallyl phenyl phosphite | K. & K. Laboratories, Inc. | do | Q-43 | 11.7 | 70 |
| 104 | N,N-diallylformamide | Aldrich Chem. Co., Inc. | do | Q-43 | 7.0 | 59 |
| 105 | N,N,N',N'-tetraallylmethylenediamine | Monomer-Polymer Labs., Inc. | do | Q-43 | 4.4 | 75 |
| 106 | Triallyl cyanurate | Aldrich Chemical Co. | Dibenzosuberone | P-33 | 7.0 | 35 |
| 107 | 4-vinyl-1-cyclohexene | K. & K. Laboratories, Inc. | Benzophenone | Q-43 | 1.6 | 70 |
| 108 | (Diethyleneglycol divinyl ether (.9 mole)) | Polysciences, Inc. | Dibenzosuberone | Q-43 | 36.6 | 42 |

3,661,744

EXAMPLES 95-117 — Continued

| Sample Number | Polyene | Source of Polyene | Photocuring*** rate accelerator | Poly-thiol* | UV thru cure** rate mils/min. | Shore A hardness, UV cured |
|---|---|---|---|---|---|---|
| | Diallyl amine (.1 mole) | Monomer-Polymer Labs., Inc. | do | | | |
| 109 | Triallyl phosphate | Aldrich Chemical Co., Inc. | do | P-33 | 10.0 | >20 |
| 110 | Diallyl carbonate | Chemical Proc. Labs., Inc. | do | Q-43 | 125.0 | 63 |
| 111 | N,N-diallyl piperazine | Chemical Proc. Labs., Inc. | do | Q-43 | 25.0 | 57 |
| 112 | Allyl diglycol carbonate | CR-39 from PPG Ind. Inc. | do | Q-43 | 100.0 | 62 |
| 113 | Polymeric diene | Example 9 | Tri(o-tolyl) phosphine | Q-43 | >5 | >20 |
| 114 | do | do | $CCl_4$ (15 parts/100 plus phenanthrene. | Q-43 | >5 | >10 |
| 115 | do | do | o-Methoxyphenyl-methyl ketone. | Q-43 | >10 | >20 |
| 116 | do | do | o-Methoxybenz-aldehyde. | Q-43 | >10 | >20 |
| 117 | do | do | $CCl_4$ (15 parts/100) | Q-43 | >3 | >20 |

*Q-43 is pentaerythritol tetrakis (β-mercaptopropionate); P-33 is trimethylolpropane tris (β-mercaptopropionate). The polythiol is used in the theoretical equivalent amount based on the polyene used.
**Sample thickness ranged from 35 to 140 mils; UV source was a 275 watt Type RS sun lamp; incident radiation intensity at surface of photocurable composition was 4000 microwatts/cm.².
***Concentration of photocuring rate accelerator varied from 0.2 to 1.5 parts/100 parts photocurable composition.

EXAMPLE 118

916 g. (0.46 moles) of a commercially available liquid polymeric diisocyanate sold under the tradename "Adiprene L-100" by E. I. duPont de Nemours and Co. was charged to a dry flask maintained under a nitrogen atmosphere and equipped with a condenser, stirrer, thermometer and gas inlet and outlet. 197 g. (0.92 moles) of the diallyl ether of trimethylolpropane was charged to the vessel along with 0.56 g. dibutyltin dilaurate catalyst. The flask and contents were heated with stirring for 30 minutes at 50° C. to yield a polytetraene of about 2,400 M.W.

To the tetraene was added 230 g. pentaerythritol tetrakis (β-mercaptopropionate), 18.4 g. benzophenone, 1.2 g. dilaurylthio-dipropionate, 136 grams of dioctyl phthalate, and 1.2 g Plastanox 2246 (hindered phenol antioxidant sold by American Cyanamid Co.). This photocurable liquid composition was cast on a glass plate in a layer 40 mils thick. It was then exposed to UV radiation from a 275 Watt Type RS sunlamp. The intensity of the radiation incident on the surface of the layer was 3000 microwatts/cm². The layer skin cured in about 1-2 seconds and cured to a solid through the entire thickness in less than 20 seconds, or at a liquid-to-solid conversion rate of over 120 mils/minute. The solid rubbery product had a Shore A hardness of 72, a tensile strength of 150 psi and an alongation at failure of 40 percent.

The solid cured polythioether polymer products resulting from the instant invention have many and varied uses. Examples of some uses include but are not limited to adhesives; caulks; elastomeric sealants; coatings, encapsulating or potting compounds; liquid castable elastomers; thermoset resins; impregnants for fabric, cloth, fibrous webs and other porous substrates; laminating adhesives and coatings; mastics; glazing compounds; fiberglass reinforced composites; sizing or surface finishing agents, filleting compounds; cure in place gasketing compounds; rocket fuel binders; foamable thermosetting resins or elastomers; molded articles such as gaskets, diaphragms, balloons, automobile tires, etc.

The molecular weight of the polyenes of the present invention may be measured by various conventional methods, including solution viscosity, osmotic pressure and gel permeation chromatography. Additionally, the molecular weight may be calculated from the known molecular weight of the reactants.

The viscosity of the polyenes and polythiols may be measured on a Brookfield Viscometer at 30° or 70° C in accord with the instructions therefor.

The components to be cured may be prepared as either single-packaged or multi-packaged liquid polymer systems which may be cured to solid polythioether elastomers without liberating gaseous by-products which cause bubbles and voids in the vulcanizate. Thus, there is provided curable liquid polymer systems composed of polyenes and polythiols in which the components individually are storage stable and which are not sensitive to or deteriorated by traces of moisture or oxygen containing gas such as may be encountered during normal storage or handling procedures. Solid resinous or elastomeric products may be prepared from flowable liquid in a system in which the rate of curing may be inhibited or retarded by the use of chemical inhibitors, antioxidants, inert atmospheres and the like. The cured product may be characterized as in the thermally and oxidatively stable state since there is no reactive carbon-to-carbon unsaturation in the main backbone chain.

As used herein the term polyene and the term polyne refers to single or complex species of alkenes or alkynes having a multiplicity of terminal reactive carbon-to-carbon unsaturated functional groups per average molecule. For example, a diene is a polyene that has two reactive carbon-to-carbon double bonds per average molecule, while a diyne is a polyyne that contains in its structure two reactive carbon-to-carbon triple bonds per average molecule. Combinations of reactive double bonds and reactive triple bonds within the same molecule are also possible such as for monovinylacetylene which is a polyeneyne under this definition. For purposes of brevity all these classes of compounds are referred to hereafter as polyenes.

In defining the position of the reactive functional carbon-to-carbon unsaturation, the term terminal is intended to mean that functional unsaturation is at an end of the main chain in the molecule; whereas by near terminal is intended to mean that the functional unsaturation is not more than 10 carbon atoms and typically less than eight carbon atoms from an end of the main chain in the molecule. The term pendant means that the reactive carbon-to-carbon unsaturation is located terminal or near-terminal in a branch of the main chain as contrasted to a position at or near the ends of the main chain. For purposes of brevity all of these positions are referred to herein generally as terminal unsaturation.

Functionality as used herein refers to the average number of ene or thiol groups per molecule in the polyene or polythiol, respectively. For example a triene is a polyene with an average of three reactive carbon-to-carbon unsaturated groups per molecule and thus has a functionality (f) of three. A dithiol is a polythiol with an average of two thiol groups per molecule and thus has a functionality (f) of two.

It is to be understood that the functionality of the polyene and the polythiol component is commonly expressed in whole numbers although in practice the actual functionality may be fractional. For example, a polyene component having a nominal functionality of 2 (from theoretical considerations alone) may in fact have an effective functionality of somewhat less than 2. In an attempted synthesis of a diene from a glycol in which the reaction proceeds to 100 percent of the theoretical value for complete reaction, the functionality (assuming 100 percent pure starting materials) would be 2.0. If however, the reaction were carried to only 90 percent of theory for complete reaction, about 10 percent of the molecules present would have only one ene functional group, and there may be a trace of material that would have no ene functional groups at all. Approximately 90 percent of the molecules, however, would have the desired diene structure and the product as a whole then would have an actual functionality of 1.9. Such a product is useful in the instant invention and is referred to herein as having a functionality of 2.

The term reactive unsaturated carbon-to-carbon groups means groups which will react under proper conditions as set forth herein with thiol groups to yield the thioether linkage

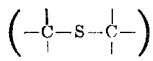

as contrasted to the term unreactive carbon-to-carbon unsaturation which means

groups found in aromatic nucleii (cyclic structures exemplified by benzene, pyridine, anthracene, and the like) which do not under the same conditions react with thiols to give thioether linkages.

Highly water-sensitive groups are intended to include, for example, isocyanate, acylhalide such as acylchloride, anhydride and the like which readily react with water, alcohols, ammonia, amines and the like.

Odorless has been used herein to mean the substantial absence of the well-known offensive and sometimes obnoxious odors that are characteristic of hydrogen sulfide and the derivative family of compounds known as mercaptans.

The term non-yellowing means the substantial resistance during prolonged exposure to actinic radiation such as exposure in sunlight, to unsightly or uncontrollable discoloration.

It is understood that the foregoing detailed description is given merely by way of illustration and that many variations may be made therein without departing from the spirit of this invention.

What is claimed is:

1. A photocurable composition useful for obtaining an essentially odorless, solid polythioether, said photocurable composition consisting essentially of:

A. a terminally unsaturated polyene component which comprises the formula:

$$[A] (X)_m$$

wherein $m$ is an integer of at least 2, wherein X is

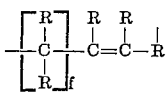

where $f$ is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, cycloalkyl and substituted cycloalkyl; said substituents on said substituted members selected from the group consisting of nitro, chloro, fluoro, acetoxy, acetamide, phenyl, benzyl, alkyl, alkoxy and cycloalkyl; said alkyl and alkoxy having from one to nine carbon atoms and said cycloalkyl having from three to eight carbon atoms;

wherein [A] is free of reactive carbon-to-carbon unsaturation; free of highly water-sensitive members; and is a polyvalent chemically compatible member of the group consisting of carbonate, carboxylate, carbonyl, ether, silane, silicate, phosphonate, phosphite, phosphate, alkyl and substituted alkyl, cycloalkyl and substituted cycloalkyl, aryl and substituted aryl, urethane and substituted urethane, urea and substituted urea, amine and substituted amine, amide and substituted amide, hydroxyl, heterocyclic carbon containing radical, and mixtures thereof; said substituents on said members being defined above, said component having a molecular weight in the range from about 64 to 20,000; and a viscosity in the range from essentially 0 to 20 million centipoises at 70° C.;

B. a polythiol component having a molecular weight in the range from about 50 to about 20,000 of the general formula:

$$R_8 (SH)_n$$

wherein $R_8$ is a polyvalent organic moiety free from reactive carbon-to-carbon unsaturation and $n$ is at least 2, the sum of $m$ and $n$ being greater than 4, with the ene/thiol mole ratio being selected so as to provide a cross-linked solid, self-supporting cured product; and C. a photocuring rate accelerator.

2. The composition of claim 1 wherein [A] has the formula:

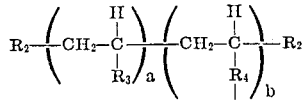

wherein a and b are integers greater than 1;

$R_2$ is a member of the group consisting of hydrogen and alkyl;

$R_3$ is a member of the group consisting of hydrogen, and saturated alkyl;

$R_4$ is a divalent derivative of the group consisting of phenyl, benzyl, alkyl, cycloalkyl, substituted phenyl, substituted benzyl, substituted alkyl and substituted cycloalkyl, said alkyl, cycloalkyl and substituents on members substituted being defined in claim 1.

3. The composition of claim 5 wherein the photocuring rate accelerator is a member selected from the group consisting of aryl aldehyde, diaryl ketone, alkyl aryl ketone, triaryl phosphine, and a blend of carbon tetrahalide with polynuclear aromatic hydrocarbon.

4. The composition of claim 1 wherein the polyene has the formula:

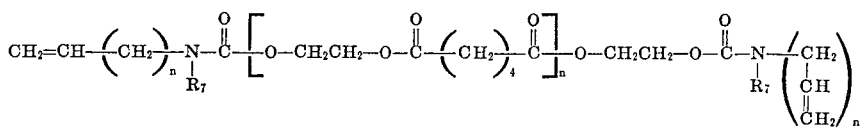

wherein $n$ is at least 1; and $R_7$ is a member of the group consisting of

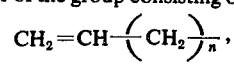

hydrogen, phenyl, cycloalkyl and alkyl;

said substituent on member which is substituted, the cycloalkyl, and the alkyl defined as in claim 1.

5. The composition of claim 1 wherein the polyene has the formula:

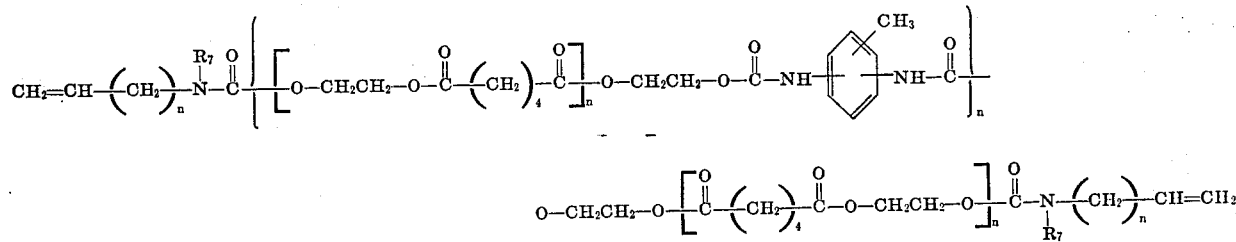

wherein $n$ is at least 1; and
$R_7$ is a member of the group consisting of $$CH_2=CH-(CH_2)_n,$$

hydrogen, phenyl, cycloalkyl and alkyl;

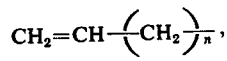

said substituent on member which is substituted, the cycloalkyl, and the alkyl defined as in claim 1.

6. The composition of claim 1 wherein the polyene has the formula:

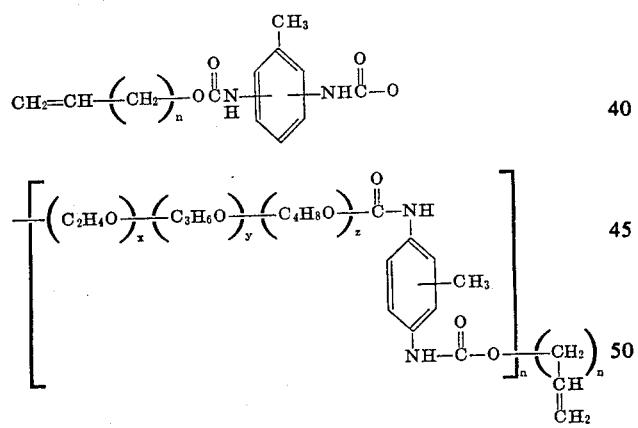

where $n$ is at least 1, and the sum of $x+y+z$ is at least 1.

7. The composition of claim 1 wherein the polyene has the formula:

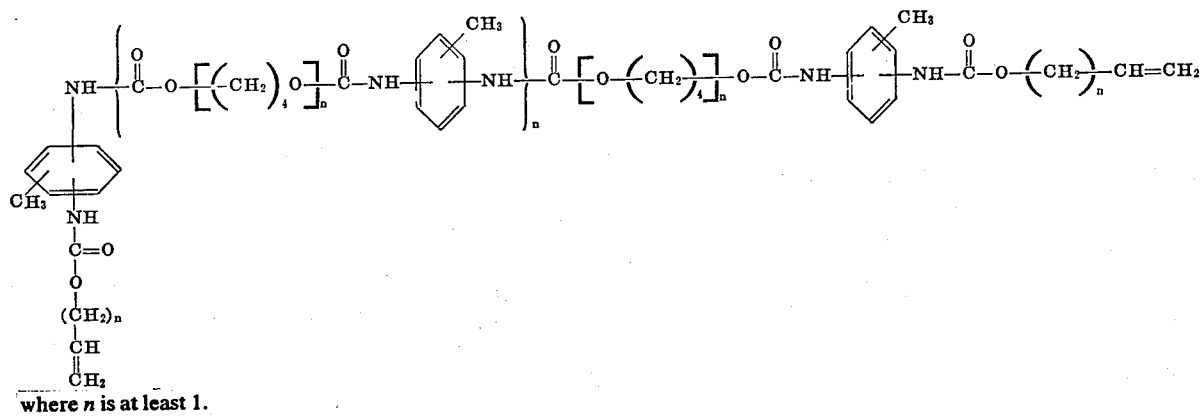

where $n$ is at least 1.

8. The composition of claim 1 wherein the polyene has the formula:

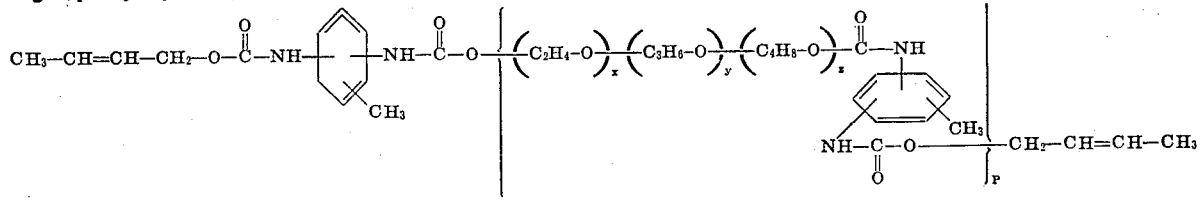

wherein the sum of $x+y+z$ is at least 1; $n$ is at least 1, and P is at least 2.

9. The composition of claim 1 wherein the polyene has the formula:

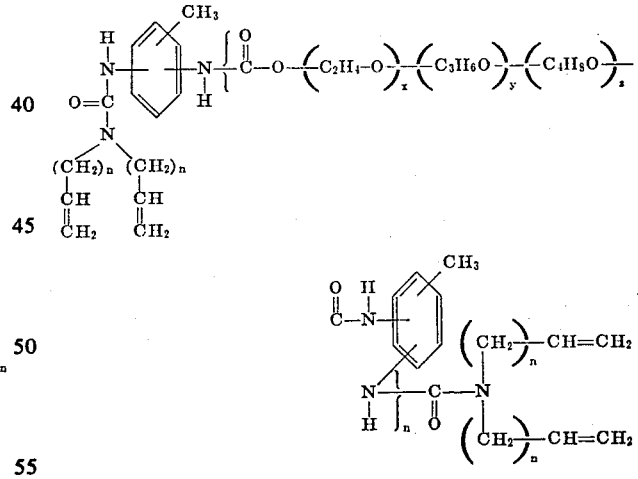

wherein the sum of $x+y+z$ is at least 1; $n$ is at least 1.

10. The composition of claim 1 wherein the polyene has the formula:

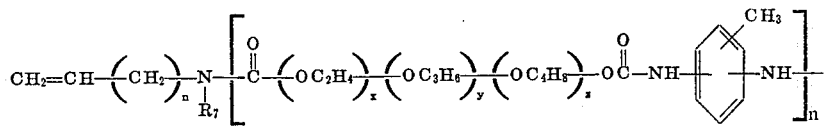

wherein the sum of $x + y + z$ in each chain segment is at least 1;

$n$ is at least 1; and $R_7$ is a member of the group consisting of $$CH_2=CH-(CH_2)_n-,$$

hydrogen, phenyl, cycloalkyl, and alkyl;

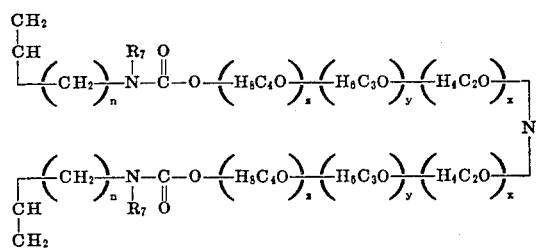

said substituent on member which is substituted, the cycloalkyl and the alkyl defined as in claim 1.

11. The composition of claim 1 wherein the polyene has the formula:

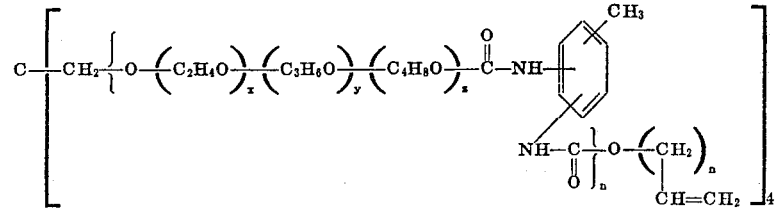

wherein the sum $x + y + 2$ in each chain segment is at least 1; $n$ is at least 1.

12. The composition of claim 1 wherein the polyene has the formula:

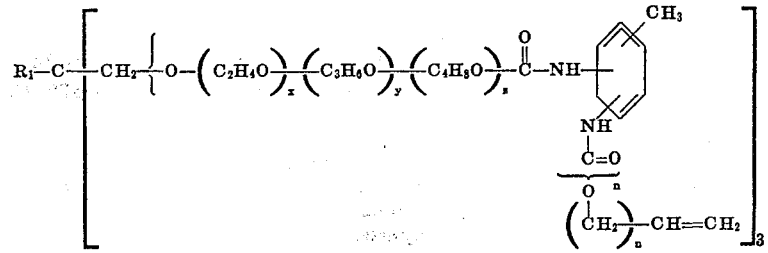

wherein the sum of $x + y + z$ in each chain segment is at least 1;

$n$ is at least 1.

$R_1$ is selected from the group consisting of hydrogen, phenyl, benzyl, alkyl, cycloalkyl, and substituted phenyl;

said substituent on member which is substituted, the cycloalkyl and the alkyl defined as in claim 1.

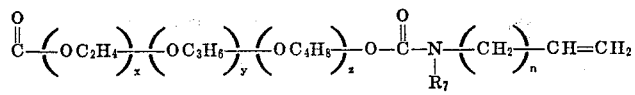

13. The composition of claim 1 wherein the polyene has the formula:

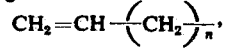

where $n$ is at least 1.

14. The composition of claim 1 wherein the polyene has the formula:

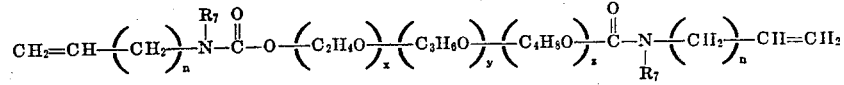

wherein $q$ is at least 2; the sum of $x + y + z$ in each chain segment is at least 1; $n$ is at least 1; and $R_7$ is a member of the group consisting of $$CH_2=CH-(CH_2)_n-,$$

hydrogen, phenyl, cycloalkyl and alkyl;

said substituent on member which is substituted, the cycloalkyl and the alkyl defined as in claim 1.

15. The composition of claim 1 wherein the polyene has the formula:

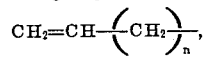

wherein the sum of $x + y + z$ is at least 1;

$n$ is at least 1; and $R_7$ is a member of the group consisting of $$CH_2=CH-(CH_2)_n-,$$

hydrogen, alkyl, phenyl, and cycloalkyl said alkyl and cycloalkyl defined as in claim 1.

16. The composition of claim 1 wherein the polyene has the formula:

$$R_1-C\left[CH_2-O-\left(C_2H_4O\right)_x\left(C_3H_6O\right)_y\left(C_4H_8O\right)_z-\overset{O}{\underset{R_7}{C}}-N-\left(CH_2\right)_n-CH=CH_2\right]_3$$

wherein the sum of $x + y + z$ in each chain segment is at least 1; $n$ is at least 1;
$R_1$ is selected from the group consisting of hydrogen, phenyl, benzyl, alkyl, cycloalkyl, and substituted phenyl; and
$R_7$ is a member of the group consisting of $$CH_2=CH-\left(CH_2\right)_n,$$

hydrogen, alkyl, phenyl, and cycloalkyl;
said member which is substituted, the cycloalkyl and the alkyl defined as in claim 1.

17. The composition of claim 1 wherein the polyene has the formula:

$$C\left[CH_2O-\left(C_2H_4O\right)_x\left(C_3H_6O\right)_y\left(C_4H_8O\right)_z-\overset{O}{\underset{R'}{C}}-N-\left(CH_2\right)_n-CH=CH_2\right]_4$$

wherein the sum of $x + y + z$ in each chain segment is at least 1; $n$ is at least 1;
$R_7$ is a member of the group consisting of $$CH_2=CH-\left(CH_2\right)_n,$$

hydrogen, phenyl, cycloalkyl and alkyl;
said member which is substituted, the cycloalkyl and the alkyl defined as in claim 1.

18. The composition of claim 1 wherein the polyene has the formula:

$$[R_1-\overset{|}{\underset{|}{C}}-O-\left(C_2H_4O\right)_x\left(C_3H_6O\right)_y\left(C_4H_8O\right)_z-\overset{O}{\underset{}{C}}-\overset{R_7}{\underset{}{N}}-\left(CH_2\right)_n-CH=CH_2]_p$$

with $CH_2O-$ groups above and below bearing the same $(C_2H_4O)_x(C_3H_6O)_y(C_4H_8O)_z-C(O)-N(R_7)-(CH_2)_n-CH=CH_2$ chains.

wherein the sum of $x + y + z$ in each chain segment is at least 1;
$p$ is an integer from 1 to 4;
$n$ is at least 1;
$R_1$ is selected from the group consisting of hydrogen, phenyl, benzyl, alkyl, cycloalkyl, and substituted phenyl;
$R_7$ is a member consisting of $$CH_2=CH-\left(CH_2\right)_n,$$

hydrogen, phenyl, cycloalkyl, and alkyl;
said member which is substituted, the cycloalkyl, and the alkyl defined as in claim 1.

19. The composition of claim 1 wherein the polyene has the formula:

$$C_3H_5O-\left(C_3H_6-O\right)_y-C_3H_5$$

wherein $y$ is at least 1.

20. The composition of claim 1 wherein the mole ratio of ene to thiol is from about 0.2/1 to about 5/1.

21. The composition of claim 1 wherein the mole ratio of ene to thiol is about 0.75/1 to about 1.5/1.

22. A process of forming essentially odorless solid polythioether which comprises
I. Admixing:

A. a terminally unsaturated polyene component which comprises the formula:

$$[A]-(X)_m$$

wherein $m$ is an integer of at least 2; wherein X is $$-\left[\overset{R}{\underset{R}{C}}\right]_f-\overset{R}{\underset{}{C}}=\overset{R}{\underset{}{C}}-R$$

where $f$ is an integer from 1 to 9; R is a radical selected from the group consisting of hydrogen, fluorine, chlorine, furyl, thienyl, pyridyl, phenyl and substituted phenyl, benzyl and substituted benzyl, alkyl and substituted alkyl, alkoxy and substituted alkoxy, cycloalkyl and substituted cycloalkyl; said substituents on said substituted members selected from the group consisting of nitro, chloro, fluoro, acetoxy, acetamide, phenyl, benzyl, alkyl, alkoxy and cycloalkyl; said alkyl and alkoxy having from one to nine carbon atoms and said cycloalkyl having from three to eight carbon atoms;
wherein [A] is free of reactive carbon-to-carbon unsaturation; free of highly water-sensitive members; and is a polyvalent chemically compatible member of the group consisting of carbonate, carboxylate, carbonyl, ether, silane, silicate, phosphonate, phosphite, phosphate, alkyl and substituted alkyl, cycloalkyl and substitute cycloalkyl, aryl and substituted aryl, urethane and substituted urethane, urea and substituted urea, amine and substituted amine, amide and substituted amide, hydroxyl, heterocyclic carbon containing radical, and mixtures thereof; said substitutents on said members being defined above, said component having a molecular weight in the range from about 64 to 20,000; and a viscosity in the range from essentially 0 to 20 million centipoises at 70° C.;

B. a polythiol component having a molecular weight in the range from about 50 to about 20,000 of the general formula:

$$R_8-(SH)_n$$

wherein $R_8$ is a polyvalent organic moiety free from reactive carbon-to-carbon unsaturation and $n$ is at least 2, the sum of $m$ and $n$ being greater than 4, with the ene/thiol mole ratio being selected so as to provide a cross-linked solid, self-supporting cured product; and
C. a photocuring rate accelerator, and thereafter
II. exposing the mixture to actinic light.

23. A photocurable composition useful for obtaining an essentially odorless, solid polythioether, said photocurable composition consisting essentially of:
A. a terminally unsaturated polyene component having the formula:

$$CH_2=CH-CH_2OCH_2 \quad\quad CH_3 \quad\quad\quad\quad\quad\quad\quad\quad\quad\quad\quad\quad CH_3$$
$$H_5C_2-\overset{|}{C}-CH_2O\overset{O}{\overset{\|}{C}}NH-\phantom{x}-NH\overset{O}{\overset{\|}{C}}O-\left(CH_2CH_2CH_2CH_2-O\right)_{23}-\overset{O}{\overset{\|}{C}}-NH-\phantom{x}-NH\overset{O}{\overset{\|}{C}}-OCH_2-\overset{|}{C}-C_2H_5$$
$$CH_2=CH-CH_2OCH_2 \quad\quad\quad\quad\quad\quad\quad\quad\quad\quad\quad\quad\quad\quad\quad\quad\quad\quad CH_2OCH_2CH=CH_2$$

wherein the functionality is 4;

B. A polythiol component, said polythiol being pentaerythritol tetrakis (β-mercaptopropionate), having a functionality of 4, and wherein the sum of the functionalities of the polyene and the polythiol is 8, with the polyene/polythiol mole ratio being selected so as to provide a solid, self-supporting cured product; and C. a photocuring rate accelerator, said accelerator being benzophenone disposed in an effective amount.

24. The solid product prepared by the process of claim 23.

25. The process of claim 23 wherein the actinic light is ultraviolet radiation having a wavelength between about 2,000 A and about 4,000 A.

26. The process of claim 23 wherein the composition contains from 0.0005 to 50 parts by weight of a photocuring rate accelerator.

27. The process of claim 23 wherein the photocuring rate accelerator is selected from the group consisting of aryl aldehyde; diaryl ketone; alkyl aryl ketone; triaryl phosphine; a blend of carbon tetrahalide with polynuclear aromatic hydrocarbon.

28. An article comprising the composition of claim 23 as a coating on a substrate.

29. An article comprising the composition of claim 23 as an adhesive between two substrates.

30. An article comprising the composition of claim 23 as an elastomeric sealant.

31. A shaped, molded article cast from the composition of claim 23.

* * * * *